United States Patent [19]

Bigus

[11] Patent Number: 5,787,425
[45] Date of Patent: Jul. 28, 1998

[54] OBJECT-ORIENTED DATA MINING FRAMEWORK MECHANISM

[75] Inventor: Joseph Phillip Bigus, Rochester, Minn.

[73] Assignee: International Business Machines Corporation, Armonk, N.Y.

[21] Appl. No.: 723,599

[22] Filed: Oct. 1, 1996

[51] Int. Cl.⁶ .................................................. G06F 17/30
[52] U.S. Cl. .............................. 707/6; 707/103; 395/10; 395/21; 395/51
[58] Field of Search .................. 707/6, 103; 395/10, 395/21, 51

[56] References Cited

U.S. PATENT DOCUMENTS 5,692,107  11/1997  Simoudis et al. ............... 395/50
5,717,877  2/1998   Orton et al. .................... 395/326
5,724,573  3/1998   Agrawal et al. ................ 707/6
5,727,199  3/1998   Chen et al. ..................... 707/6

*Primary Examiner*—Thomas G. Black
*Assistant Examiner*—John C. Loomis
*Attorney, Agent, or Firm*—Owen J. Gamon

[57] ABSTRACT

An object oriented framework for data mining operates upon a selected data source and produces a result file. Certain core functions are performed by the framework, which interact with the extensible function. This separation of core and extensible functions allows the separation of the specific processing sequence and requirement of a specific data mining operation from the common attribute of all data mining operations. The user may thus define extensible functions that allow the framework to perform new data mining operations without the framework having the knowledge of the specific processing required by those operations.

29 Claims, 29 Drawing Sheets

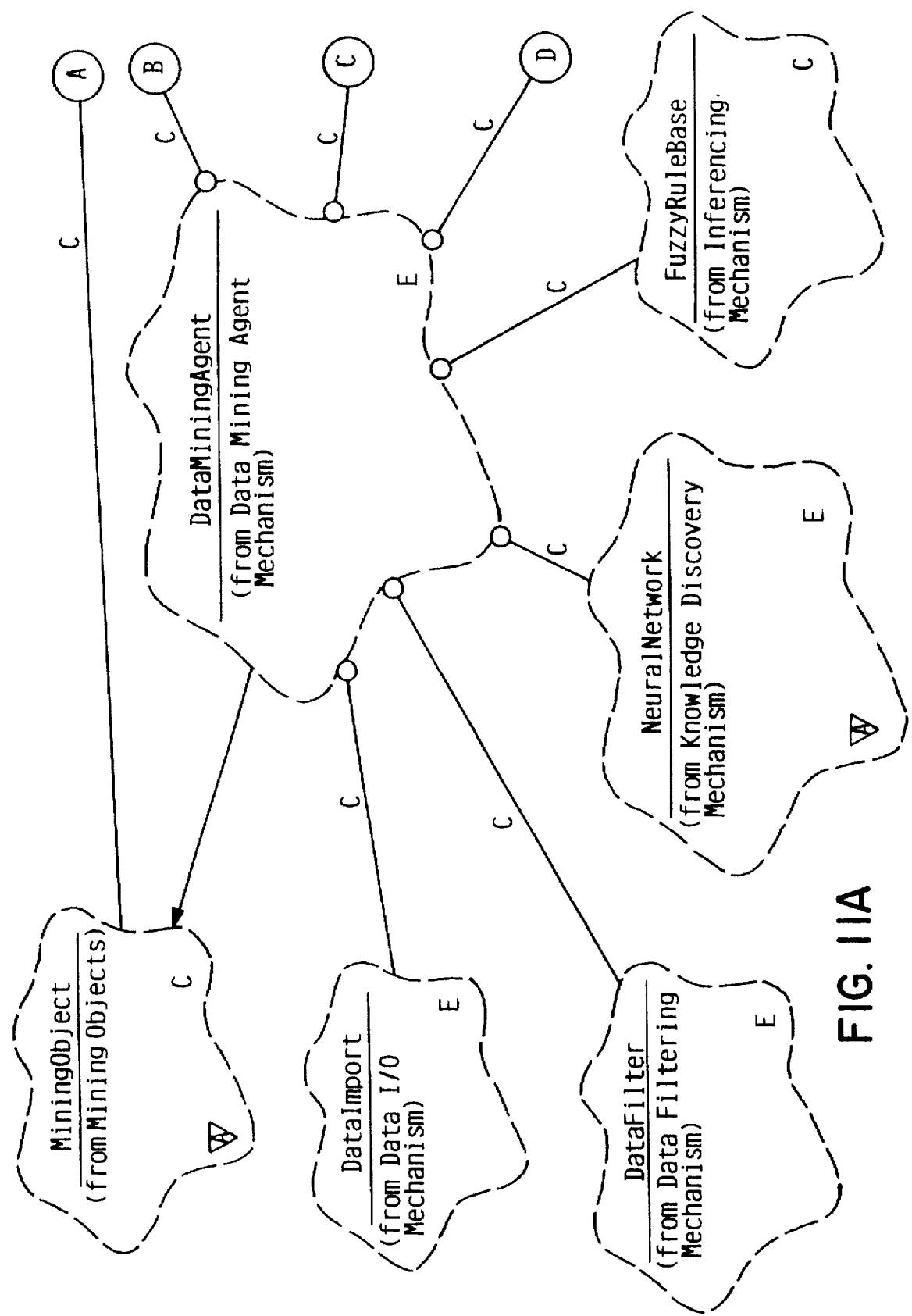
FIG. IIA

OBJECT-ORIENTED DATA MINING FRAMEWORK MECHANISM

FIELD OF THE INVENTION

The present invention relates in general to the data processing field. More specifically, the present invention relates to the field of Object Oriented framework mechanisms.

BACKGROUND OF THE INVENTION

The development of the EDVAC computer system of 1948 is often cited as the beginning of the computer era. Since that time, computer systems have evolved into extremely sophisticated devices, capable of storing and processing vast amounts of data. As the amount of data stored on computer systems has increased, the ability to interpret and understand the information implicit in that data has diminished.

In the past, data was stored in flat files, then hierarchical and network data based systems, and now in relational or object oriented databases. The primary method for analyzing that data has been to form well structured queries, for example using SQL (Structured Query Language), and then to perform simple aggregations or hypothesis testing against that data.

Recently, a new technique called data mining has been developed, which allows a user to search large databases and to discover hidden patterns in that data. Data mining is thus the efficient discovery of valuable, non-obvious information from a large collection of data and centers on the automated discovery of new facts and underlying relationships in the data. The term "data mining" comes from the idea that the raw material is the business data, and the data mining algorithm is the excavator, shifting through the vast quantities of raw data looking for the valuable nuggets of business information.

Because data can be stored in such a wide variety of formats and because the data values can have such a wide variety of meanings, data mining applications have in the past been written to perform specific data mining operations, and there has been little or no reuse of code between application programs. Thus, each data mining application is written from scratch, making the development process long and expensive. Although the nuggets of business information that a data mining application discovers can be quite valuable, they are of little use if they are expensive and untimely discovered. Returning to the mining analogy, even if gold is selling for $900 per ounce, nobody is interested in operating a gold mine if it takes two years and $901 per ounce to get it out of the ground.

SUMMARY OF THE INVENTION

As discussed in the Background section, there is serious need in the industry for a customizable, user-extensible data mining system that can be reused in a variety of applications. These benefits and advantages are provided by an object-oriented framework mechanism. Those who are unfamiliar with object-oriented technology, or with object-oriented framework mechanisms, should read the object-oriented overview section of the Description of the Preferred Embodiments section before reading this section.

According to the present invention, an object oriented framework for data mining operates upon a selected data source and produces a result file. Certain core functions are performed by the framework, which interact with the extensible function. This separation of core and extensible functions allows the separation of the specific processing sequence and requirement of a specific data mining operation from the common attribute of all data mining operations. The user may thus define extensible functions that allow the framework to perform new data mining operations without the framework having the knowledge of the specific processing required by those operations.

DESCRIPTION OF THE PREFERRED EMBODIMENTS

Overview—Object-Oriented Technology

Figure 1:
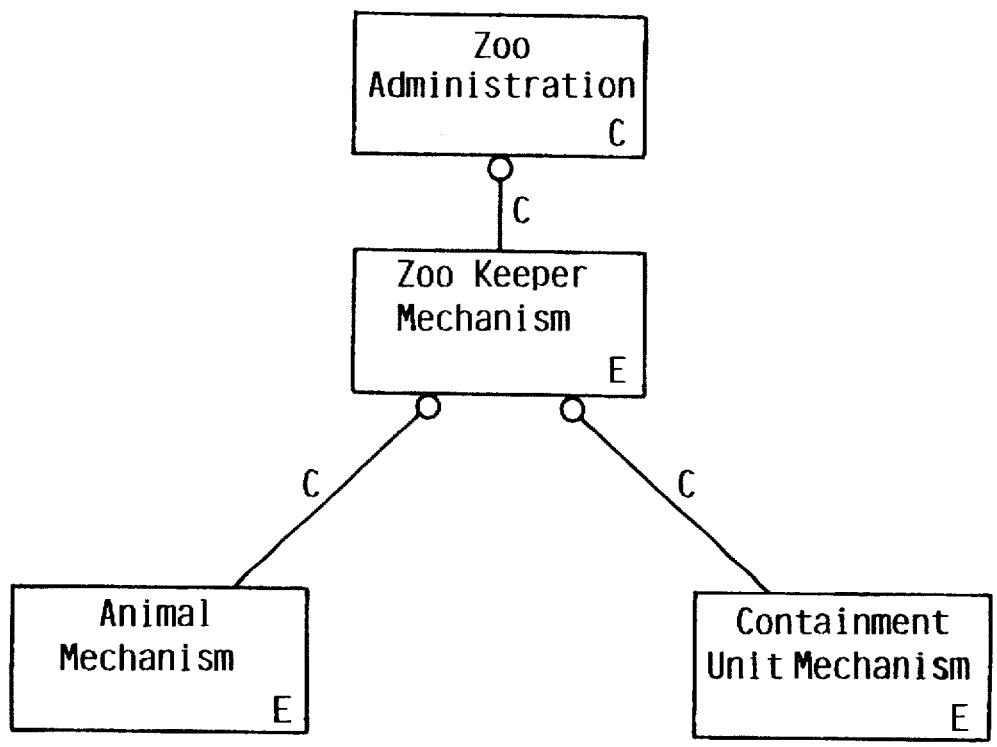
FIG. 1 is a category diagram of an example framework mechanism.

As discussed in the Summary section, the present invention was developed using Object-oriented (OO) framework technology. Individuals skilled in the art of OO framework technology may wish to proceed to the Detailed Description section of this specification. However, those individuals who are new to framework technology, or new to OO technology in general, should read this overview section in order to best understand the benefits and advantages of the present invention.

Object-oriented Technology v. Procedural Technology

Though the present invention relates to a particular OO technology (i.e., OO framework technology), the reader must first understand that, in general, OO technology is significantly different than conventional, process-based technology (often called procedural technology). While both technologies can be used to solve the same problem, the ultimate solutions to the problem are always quite different. This difference stems from the fact that the design focus of procedural technology is wholly different than that of OO technology. The focus of process-based design is on the overall process that solves the problem; whereas, the focus of OO design is on how the problem can be broken down into a set of autonomous entities that can work together to provide a solution. The autonomous entities of OO technology are called objects. Said another way, OO technology is significantly different from procedural technology because problems are broken down into sets of cooperating objects instead of into hierarchies of nested computer programs or procedures.

The Term Framework

There has been an evolution of terms and phrases which have particular meaning to those skilled in the art of OO design. However, one of loosest definitions in the OO art is the definition of the word framework. The word framework means different things to different people. Therefore, when comparing the characteristics of two supposed framework mechanisms, the reader should take care to ensure that the comparison is indeed "apples to apples." As will become more clear in the forthcoming paragraphs, the term framework is used in this specification to describe an OO mechanism that has been designed to have core function and extensible function. The core function is that part of the framework mechanism that is not subject to modification by the framework purchaser. The extensible function, on the other hand, is that part of the framework mechanism that has been explicitly designed to be customized and extended by the framework purchaser.

OO Framework Mechanisms

While in general terms an OO framework mechanism can be properly characterized as an OO solution, there is nevertheless a fundamental difference between a framework mechanism and a basic OO solution. The difference is that framework mechanisms are designed in a way that permits and promotes customization and extension of certain aspects of the solution. In other words, framework mechanisms amount to more than just a solution to the problem. The mechanisms provide a living solution that can be customized and extended to address individualized requirements that change over time. Of course, the customization/extension quality of framework mechanisms is extremely valuable to purchasers (referred to herein as framework consumers) because the cost of customizing or extending a framework is much less than the cost of a replacing or reworking an existing solution.

Therefore, when framework designers set out to solve a particular problem, they do more than merely design individual objects and how those objects interrelate. They also design the core function of the framework (i.e., that part of the framework that is not to be subject to potential customization and extension by the framework consumer) and the extensible function of the framework (i.e., that part of the framework that is to be subject to potential customization and extension). In the end, the ultimate worth of a framework mechanism rests not only on the quality of the object design, but also on the design choices involving which aspects of the framework represent core function and which aspects represent extensible function.

ZAF—An Illustrative Framework Mechanism

While framework design is necessarily an intertwined and iterative process, example design choices for a simplistic framework mechanism are set forth in the paragraphs that follow. It should be understood, though, that this is only an example framework that is being used in this specification to illustrate and best explain framework mechanisms such that the reader can understand and appreciate the benefits and advantages of the present invention.

Framework designers determine what objects are needed for a framework mechanism by selecting objects from what is called the problem domain. The problem domain is an abstract view of the specific problem at hand. The example problem domain chosen for this illustrative framework mechanism is that of zoo administration. The specific problem is that of designing a mechanism that assists zoo keepers in the care and feeding of zoo animals. In our example of a Zoo Administration Framework (ZAF), an OO framework designer would look to the zoological problem domain and decide that any ZAF would of necessity involve a mechanism that represented the relationship between zoo keepers and animals (i.e., to represent how zoo keepers care for animals). The framework designer would also likely recognize that zoo animals usually live in cages, pens, tanks, and other sorts of containment units. Therefore, our framework designer would start with the idea that the framework would have to involve mechanisms that represented all of these fundamental entities and relationships.

How ZAF is Designed

To begin the design process, our framework designer would likely begin with what is called a category diagram. Category diagrams are used to describe high level framework mechanisms, and how those mechanisms relate to one another. FIG. 1 is a category diagram for the example framework ZAF. The notation used in FIG. 1, and that used in the other figures of this specification, is explained in detail in the Notation section at the end of this specification. Each mechanism in a category diagram represents groupings of objects that perform a particular function. For the purposes of illustration, assume that our framework designer decides that ZAF should be made up of four high level mechanisms: a zoo administration mechanism, a zoo keeper mechanism, an animal mechanism, and a containment unit mechanism.

As shown in FIG. 1, the zoo administration mechanism has been designed to use the zoo keeper mechanism to administer the zoo. The zoo administration mechanism is therefore said to have a using relationship with the zoo keeper mechanism. (Again, refer to the notation section of this specification for an explanation of this relationship and the other notation used in this specification.)

As discussed, the zoo administration mechanism has been designed to have responsibility for overall control of ZAF. Accordingly, the zoo administration mechanism is responsible for scheduling the operation of the zoo keeper mechanism. Note also that our framework designer designed the zoo administration mechanism to be a core function of ZAF, which means that it has been designed such that it will not be subject to potential customization and extension. The C in the category box denotes this fact. The uses relationship between the zoo administration mechanism and the zoo keeper mechanism has also been designed such that it is not available for ultimate customization by the framework consumer.

The zoo keeper mechanism has been designed to be generally responsible for the care and feeding of the zoo animals. Accordingly, it uses the animal and containment unit mechanisms to perform its tasks. However, unlike the design of the zoo administration mechanism, our framework designer has designed the zoo keeper mechanism to be extensible function, which again means that the zoo keeper mechanism has been designed to be available for modification and/or extension by the framework consumer to address future care and feeding requirements. This fact is denoted by the E in the zoo keeper mechanism category box.

Our framework designer has designed the animal mechanism to represent the animal side of the interaction between zoo animals and zoo keepers. Since the animal population in the zoo is something that changes on a regular basis, the animal mechanism has similarly been designed as an extensible function. The containment unit mechanism interacts with the zoo keeper mechanism by representing individual containment units such as pens, tanks, and cages. Like the animal mechanism, the containment unit mechanism has been designed as an extensible function such that it can handle future customization and extension requirements. Even though the zoo keeper, zoo animal, and containment unit mechanisms have all been designed as extensible function, the relationships between the mechanisms have been designed to be a core function of ZAF. In other words, even though it is desirable to give ZAF's consumers flexibility relative to the zoo keeper, zoo animal, and containment unit mechanisms, it is not desirable to allow ZAF's consumers to change how these mechanisms relate to one another.

Our framework designer would next design the classes and relationships that make up the mechanisms shown on FIG. 1. A class is a definition of a set of like objects. As such, a class can be thought of as an abstraction of the objects or as a definition of a type of object. From the view of a computer system, a single object represents an encapsulated set of data and the operation or a group of operations that are performed by a computer system upon that data. In fact, in a secure computer system, the only access to the information controlled by an object is via the object itself. This is why the information contained in an object is said to be encapsulated by the object.

Each class definition comprises data definitions that define the information controlled by the object and operation definitions that define the operation or operations performed by objects on the data that each object controls. In other words, a class definition defines how an object acts and reacts to other objects by defining an operation or set of operations that is/are performed on the defined data. (Please note that operations are sometimes called methods, method programs, and/or member functions.) When taken together, the defined operation(s) and data are said to be the behavior of the object. In essence, then, a class definition defines the behavior of its member object or objects.

Figure 2A:
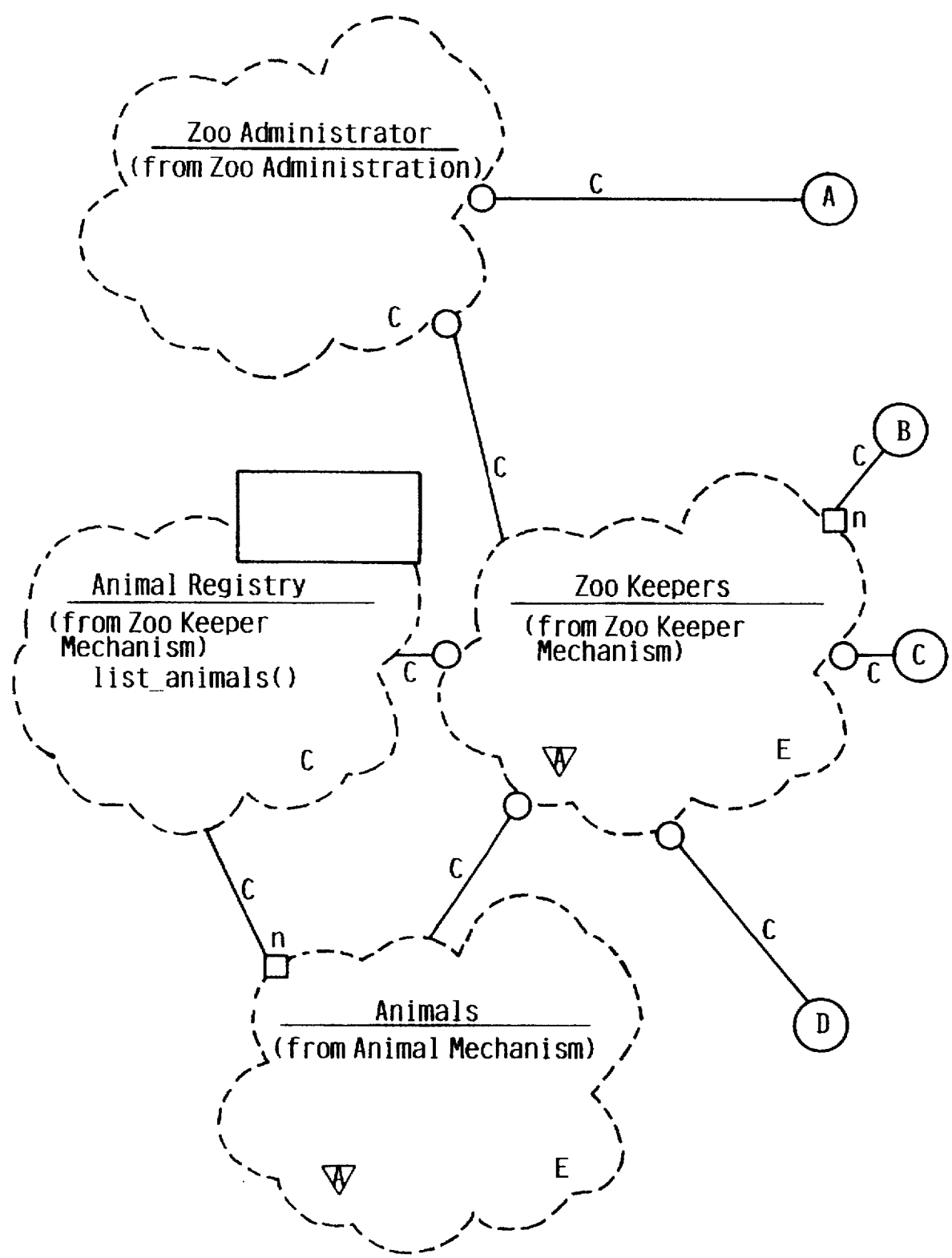
FIGS. 2 through 6 are class diagrams for the example framework mechanism of FIG. 1.
Figure 2B:
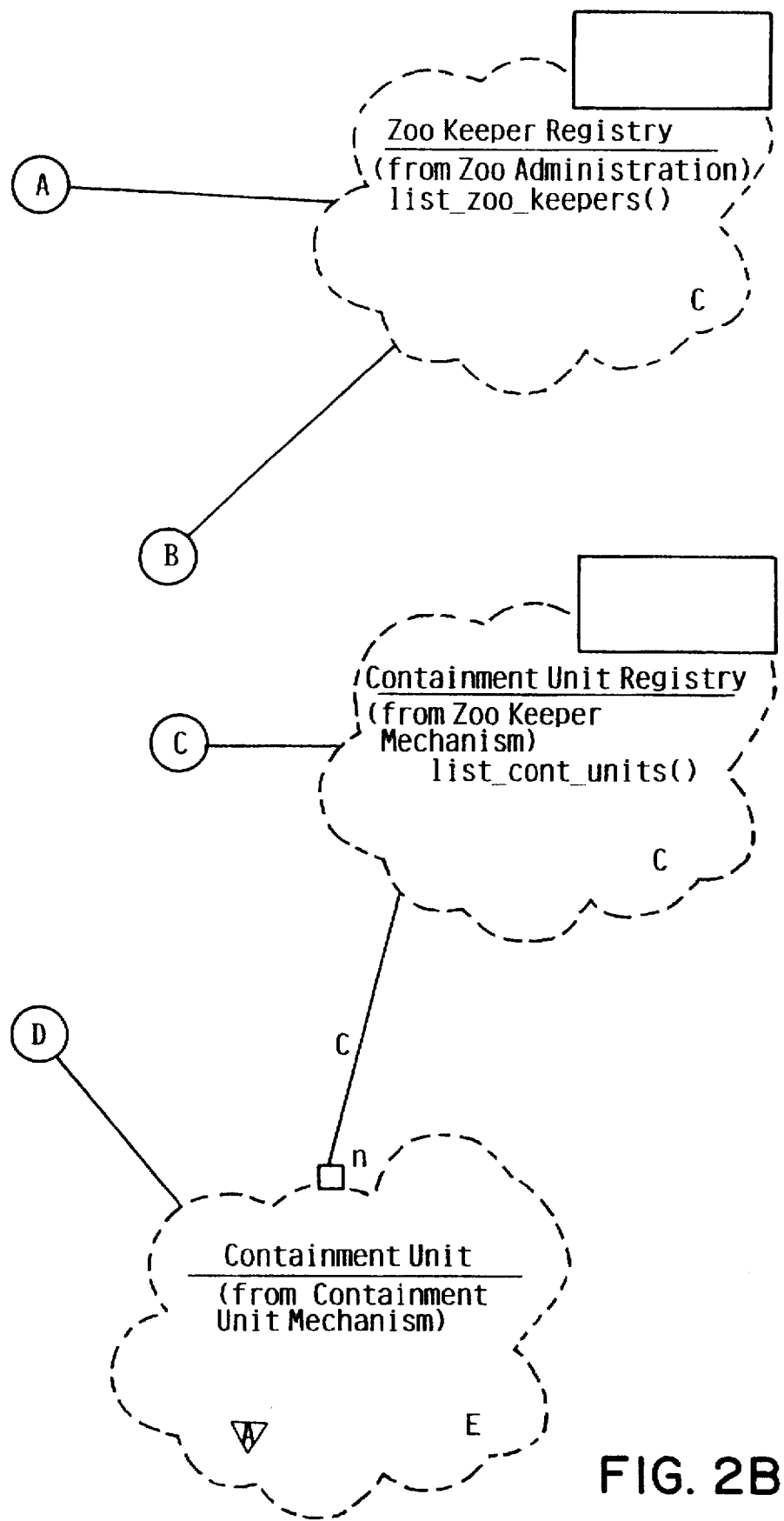

FIG. 2 is an OO class diagram that shows the fundamental classes that our framework designer has designed for ZAF. Each class representation includes its relationship to the mechanisms shown on FIG. 1. For example, the zoo keepers class is denoted as being from Zoo Keeper Mechanism. The fundamental classes of ZAF include: the zoo administrator class, which is part of the zoo administration mechanism; the zoo keeper registry class, which is also part of the zoo administration mechanism; the animal registry class, which is part of the zoo keeper mechanism; the zoo keepers class, which is also part of the zoo keeper mechanism; the containment unit registry class, which is also part of the zoo keeper mechanism; the animals class, which is part of the animal mechanism; and the containment unit class, which is part of the containment unit mechanism.

The relationships between the classes have been designed as core function of ZAF such that they are not available for ultimate modification by ZAF's consumers.

The zoo administrator class is the definition of the object that is responsible for the overall control of ZAF. Again, OO classes only define the objects that interact to provide a solution to the problem. However, it is by exploring the characteristics of the class definitions that we are able to understand how the objects of the framework mechanism have been designed to provide a living solution that can be customized and/or extended to address future requirements.

The zoo administration class has been designed to have a uses relationship with the zoo keeper registry. Our framework designer has designed the zoo administration and zoo registry classes to be a core function of ZAF because our designer has decided that ZAF's consumers should not be allowed to modify the behavior of objects that are members of these class definitions. The zoo keeper registry, which has what is called a contains by reference relationship with the zoo keeper class, is simply a class that defines an object that is a container for all zoo keeper objects. Accordingly, the zoo keeper registry includes a definition for a list_zoo_keepers( ) operation. As will be described later, this operation is responsible for providing a list of zoo keeper objects to other objects that request such a list.

Figure 3:
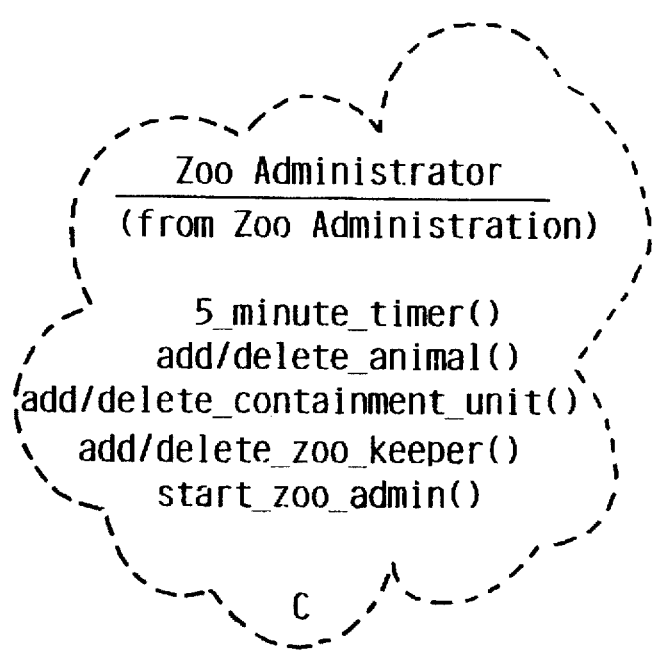

FIG. 3 shows a lower level view of the zoo administrator class. Since objects of type zoo administrator have responsibility for overall control of ZAF, the zoo administrator class has been designed to include operations that perform tasks oriented towards zoo administration. The class definition includes the following five operations: 5_minute_timer( ), add_animal( ), add_containment_unit( ), add_zoo_keeper( ), and start_zoo_admin( ).

The start_zoo_admin( ) operation is responsible for starting ZAF. That is, a user or system administrator will interact with the start_zoo_admin( ) operation to begin administration of a zoo via ZAF. Once started, our framework designer has designed the start_zoo_admin( ) operation to initiate the 5_minute_timer( ) operation. Every five minutes, the 5_minute_timer( ) operation instructs the zoo keeper objects to go out and check on the animals. The add/delete_zoo_keeper operation is responsible for interacting with users of ZAF to define additional zoo keepers (i.e., additional zoo keeper classes), to add additional zoo keepers (i.e., zoo keeper objects), and to remove zoo keeper classes and/or objects. As will become clear in the forthcoming paragraphs, each zoo keeper object is responsible for performing a particular zoo task. Therefore, it is natural that a user of ZAF might well want to add a zoo keeper definition and object to handle an additional zoo task or to remove a definition or object that is no longer needed. As will be seen, this flexibility is provided by designing the zoo keeper mechanism as an extensible function.

Like the add/delete_zoo_keeper operation, the add/delete_animal( ) operation is responsible for interacting with users to define additional zoo animal classes and objects and to remove classes and objects that are no longer needed. Again, it is quite natural for a zoo to need to add and remove animals. The add/delete_containment_unit( ) operation is responsible for the definition of new containment unit classes and objects and for removal of classes and/or objects that are no longer necessary. Again, our framework designer has designed ZAF in a way that provides this flexibility by designing the animal and containment unit mechanisms as an extensible functions.

Referring back to FIG. 2, the zoo keepers class definition has a uses relationship with the animal registry, animals, containment unit registry, and containment units classes. Since the value of ZAP is enhanced by allowing ZAF's consumers to customize and extend the zoo keepers, animals, and containment unit classes, these classes have been designed as extensible function. However, changing the behavior of the animal and containment unit registry classes would disrupt the basic operation of ZAF. Therefore, these classes have been designed to be core functions of ZAF.

While the classes and categories within ZAF have been described as either core functions or extensible functions, the term "core function" as used herein broadly relates to requirements that cause the framework to operate in the desired manner. In simple terms, core functions of a framework are the functions that any program that uses the framework will perform. The requirements of core functions may be imposed by the structure of the framework (e.g., by designating certain classes as core functions) or may be imposed by functional requirements that dictate how a framework consumer may utilize the framework. Thus, core functions include not only the classes and class relationships that are designated as core, but may also include extensible classes that must be implemented in particular ways for the framework to function properly. Said another way, while extensible function is that part of the framework that is designed to be customized by the framework consumer, the nature and extent of the customization is governed by the requirements of the framework's core function (i.e., the overall framework function imposed by the structure and functional requirements of the framework). For example, the animals class has been designed as extensible function of ZAF so that ZAF can be customized to accommodate different types of animals. However, the ability to customize the extensible animals class does not imply that the nature of the customization can violate the basic structure imposed by the core function of ZAF (e.g., by customizing the animal class to the extent that it can no longer be reasonably said to represent a type of animal).

Figure 4:
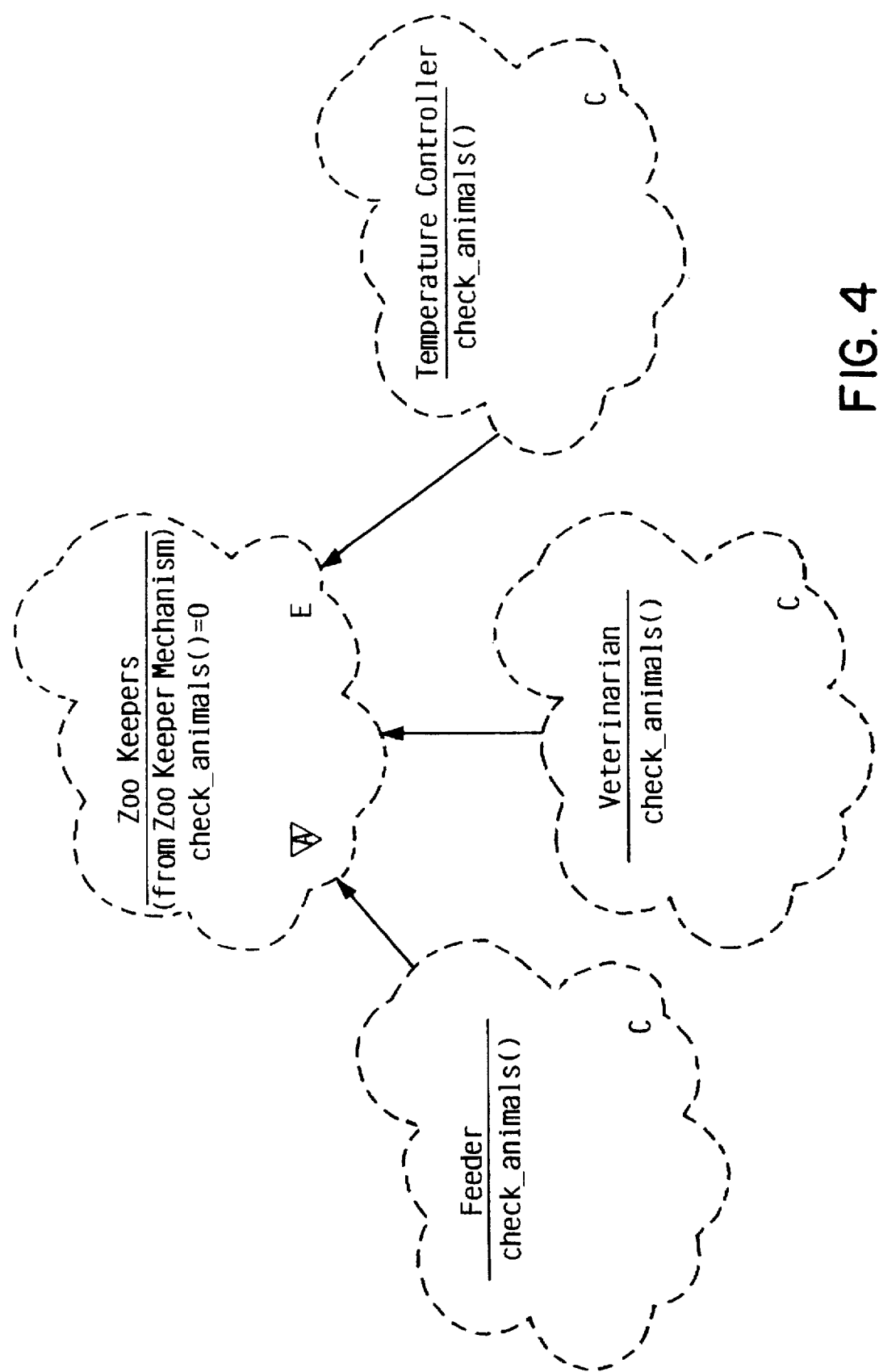

FIG. 4 is a class diagram of the zoo keeper class. However, before describing the details of FIG. 4, note that the class definitions shown on FIG. 4 are ranked in a very simple ordering called a class hierarchy. A class, like the zoo keeper class, that represents the most generalized/abstract class in a class hierarchy is referred to as the base class of the hierarchy. The ordering of classes in a class hierarchy goes from most general to least general (i.e., from general to specific). Less general classes (e.g., the feeder class) are said to inherit characteristics from the more general class or classes (i.e., the zoo keeper class in this case). As such, class definitions feeder, veterinarian, and temperature controller are said to be subclasses of the zoo keeper class. Inheritance mechanisms will be explored in more detail in the discussion associated with FIG. 5.

As shown on FIG. 4, the zoo keeper class definition contains a single operation definition, the check_animals( ) operation definition. Note that the zoo keepers class definition is marked as being an abstract class. Abstract classes are not designed to have objects created as their members, but are instead used to define a common interface/protocol for their subclasses. A class is said to be an abstract class when at least one of its operation definitions is a pure virtual operation definition. Pure virtual operation definitions are designed for the sole purpose of defining a common interface for subclass definition of that operation. In other words, the design of the actual behavior (i.e., the data and operations) is left to the subclasses themselves. In the case of the zoo keeper class definition, the feeder, veterinarian, and temperature controller subclasses define specific implementations of the pure virtual check_animals( ) operation definition that is contained in the zoo keeper class. An operation is marked as a pure virtual when it is set equal to 0.

The common interface of a pure virtual operation definition must be honored by all subclasses such that requesting objects (called client objects) can use subclass member objects (called server objects) without needing to know the particular subclass of the server object. For example, whenever the object defined by the zoo administrator class needs a particular action performed, it interacts with a zoo keeper object. Because the interface to these objects was defined in abstract, base class zoo keeper and preserved in the subclass definitions for the check_animals( ) operation, the zoo administrator object need not have special knowledge about the subclasses of any of the server objects. This has the effect of decoupling the need for the action (i.e., on the part of the zoo administrator object) from the way in which the action is carried out (i.e., by one of the objects of the zoo keepers subclasses). Designs (like the ZAP design) that take advantage of the characteristics of abstract classes are said to be polymorphic.

Polymorphism is extremely important to OO framework design because it allows the way in which something is done (called the implementation) to be changed or extended without effecting the mechanisms that depend on the fact the action is actually performed. In other words, client objects need only understand that certain objects perform certain functions, not how those functions are actually carried out. This is one way in which a properly designed framework can be readily customized and extended to satisfy future requirements.

Figure 5:
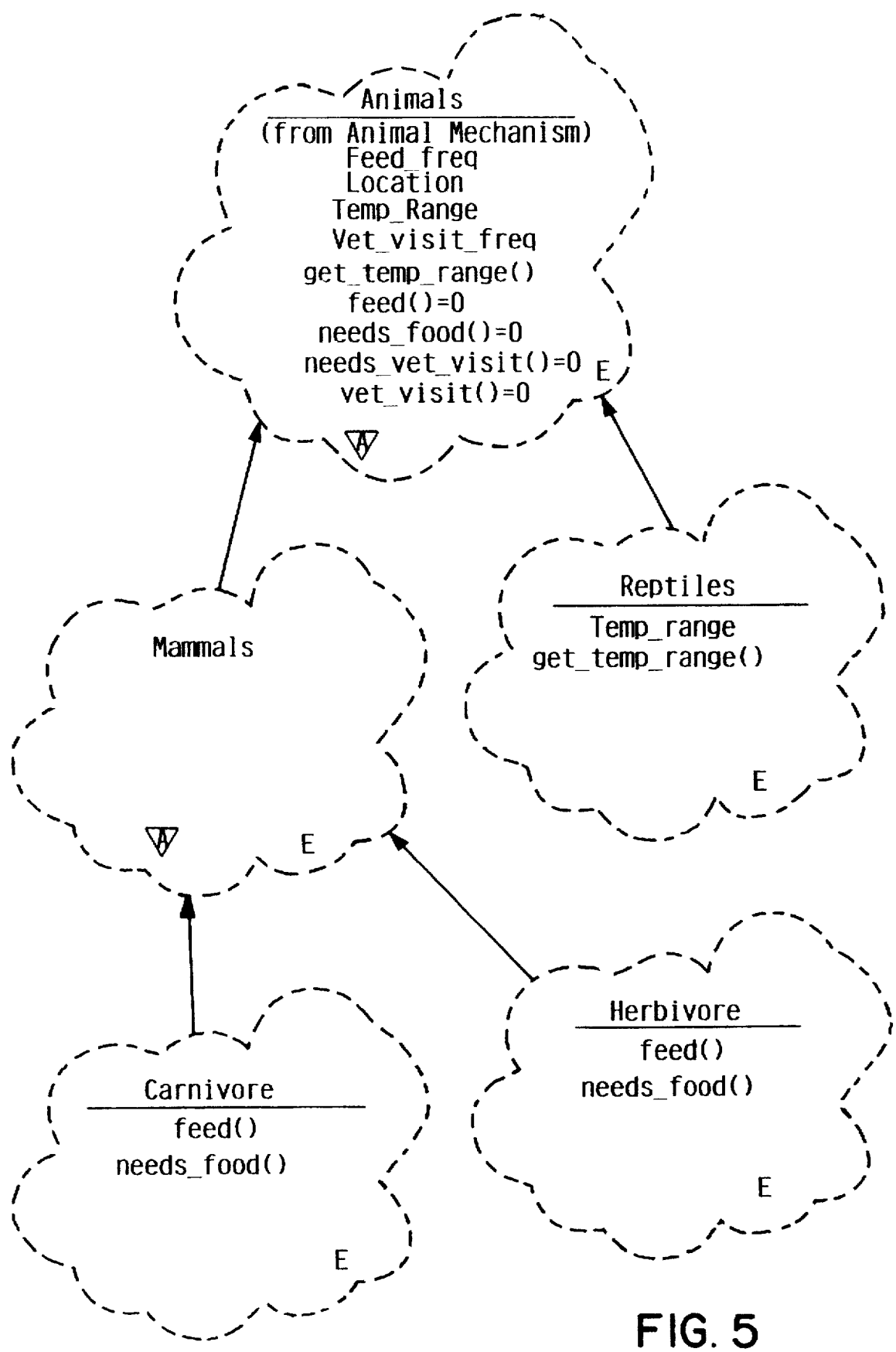

As previously discussed, our framework designer has designed ZAF such that zoo keeper objects interact with animal and containment unit objects to perform their tasks. FIG. 5 is a class diagram for the class hierarchy of the abstract class animal. Since the animals class definition is responsible for representing the characteristics and behavior of zoo animals, the framework designer has designed abstract class animal in a way that reflects this responsibility. As shown, the example animal class definition includes data definitions feed_freq, location, and temp_range and operation definitions get_temp_range( ), feed( ), needs_food( ), needs_vet_visit( ), and vet_visit( ).

For the purposes of this framework overview, it is not necessary to explore each definition in detail. However, the temp_range data definition and the get_temp_range( ) and feed( ) operation definitions are good examples of well thought out framework design choices.

The feed( ) operation definition is designed to perform the actual feeding of the animals (i.e., through specific feeding apparatus which is not shown). The feed( ) operation is a pure virtual operation. Again, this means that the design of the class is such that the actual mechanism that performs the needed function has been left to be defined by the subclasses. Requiring subclass definition is a good design choice in cases like this where objects that are created as members of the subclasses have particularized needs. In ZAF, for example, each type of animal is likely to have need for a particularized feeding apparatus, which not only makes definition of a generic feed( ) operation difficult, but valueless.

By way of comparison, the framework designer has explicitly designed the get_temp_range( ) operation such that it is not a pure virtual operation definition. This means that get_temp_range( ) has been generically defined as a default operation. As such, it is considered a virtual operation. Default operations are used to provide generic function to subclasses. The subclasses can simply use the default operations or they can customize or extend the default operations by redefinition. Redefinition of a default operation is called overriding the default operation.

Mammals is a subclass of class animals, and as such, mammals inherits all of the characteristics of class animals. Please note that class mammals is also designed as an abstract class, which again means that it has not been designed to have objects created as its members, but has instead been designed to provide a common interface for its subclasses. Subclass mammal is further subclassed into classes carnivore and herbivore.

Since definition of the feed( ) operation has been left up to the subclasses, subclasses carnivore and herbivore each have their own definition of the feed( ) operation. Again, this is a good design choice because meat eating carnivores will have different needs than their plant eating counterparts.

Temp_range is a data definition for the range of temperatures that coincides with that of the specific animal's natural habitat and the get_temp_range( ) operation definition is designed to retrieve the temp_range for a specific animal and return it to a requesting client object. Subclass reptiles contains its own data definition for temp_range and its own definition for the get temp_range( ) operation. ZAF has been designed this way to point out that data definitions can be overridden just like operation definitions. Since many reptiles live in desert conditions, where nights can be very cold and days very hot, the default temp_range definition has been overridden in the reptiles class to include time and temperature information (not explicitly shown on FIG. 5). This is another good design choice because it allows ZAF to treat reptile containment units differently than other containment units by allowing temperature adjustments to be made based on the time of day as well as on the current temperature of the containment unit itself.

Figure 6:
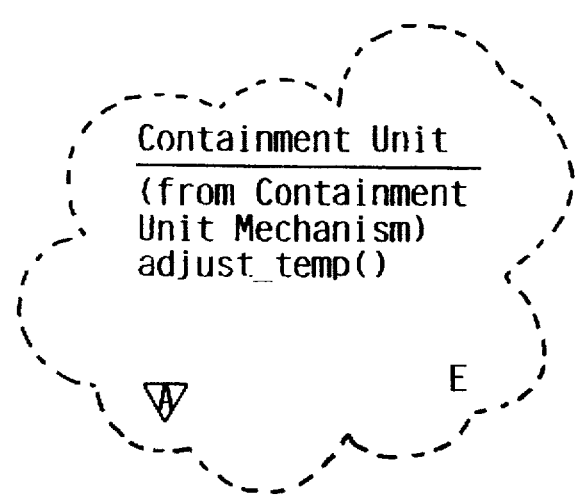

FIG. 6 is a class diagram showing a lower level view of the containment unit class. The containment unit class contains virtual operation definition adjust_temp( ). The adjust_temp definition defines both the interface and mechanism used to actually adjust the temperature in the containment units of the zoo (i.e., via heating and cooling mechanisms which are not shown).

How the ZAF Objects Interact

Beyond designing the objects that make up the solution to the specific problem, our framework designer must also design how the individual objects interrelate. In other words, the objects must interrelate in way that takes advantage of the manner in which they were designed. As discussed, the way in which the defined operations of an object operate on the data defined for the object is called the object's behavior. While objects may be characterized as autonomous entities, it is still very important that each object exhibit a consistent behavior when interrelating with other objects. Consistent behavior is important because objects depend upon the consistent behavior of other objects so that they themselves can exhibit consistent behavior. In fact, consistent behavior is so important that an object's behavior is often referred to as the contract the object has with the other objects. When an object does not exhibit a consistent behavior, it is said to have violated its contract with the other objects.

When an operation of one object needs access to the data controlled by a second object, it is considered to be a client of the second object. To access the data controlled by the second object, one of the operations of the client will call or invoke one of the operations of the second object to gain access to the data controlled by that object. One of the operations of the called object (i.e., a server operation in this case) is then executed to access and/or manipulate the data controlled by the called object.

Figure 7A:
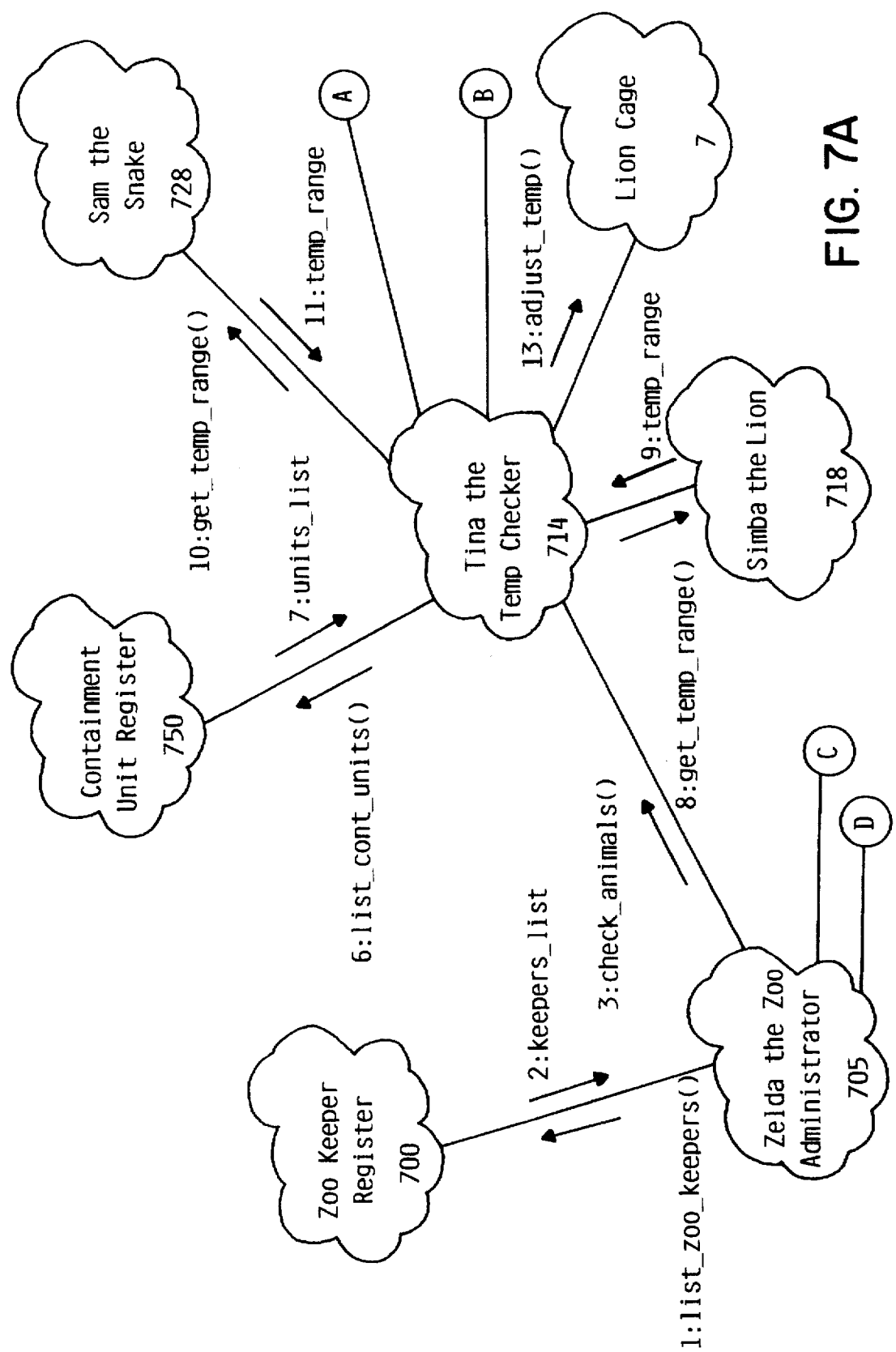
FIG. 7 is an object diagram for the example framework mechanism of FIGS. 1 through 6.
Figure 7B:
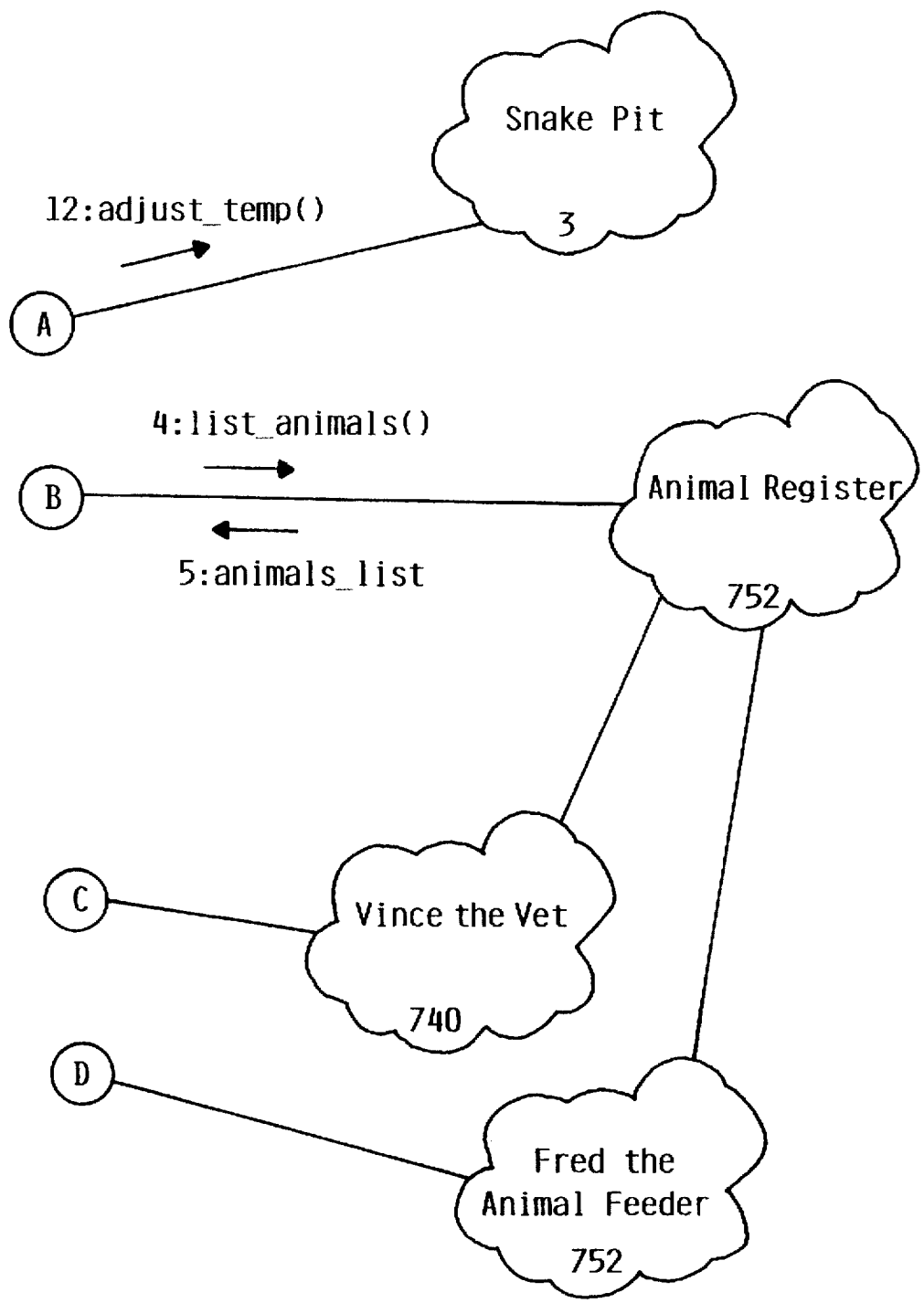

FIG. 7 is an object diagram showing how the example objects of ZAF interact to assist zoo personnel in operating the zoo. A detailed analysis of the interaction of all of the ZAF objects is unnecessary for the purposes of this overview. However, the reader should review the following simple control flow to obtain a rudimentary understanding of how objects interact to solve problems.

As mentioned, an object is created to be a member of a particular class. Therefore, Zelda the Zoo Administrator [object 706] is an object that is a member (actually the only member) of the zoo administrator class. As such, object Zelda is responsible for overall control of ZAF. All of the zoo keeper objects have registered with the Zoo Keeper Register object [object 700]. Therefore, object Zelda obtains a list of the current zoo keepers by calling the list_zoo_keepers( ) operation [step 1] of the Zoo Keeper Register object. The Zoo Keeper Register object has been created as a member of the zoo keeper register class. For the purposes of illustration, assume that this occurs every five minutes as part of Zelda's 5_minute_timer( ) operation. The Zoo Keeper Register object then responds with the zoo keepers list [step 2]. The list of zoo keepers includes Tina the Temperature Checker [object 714], Vince the Vet. [object 740], and Fred the Animal Feeder [object 752]. Each zoo keeper has been created as a member of the zoo keepers class. In particular, objects Tina the Temp. Checker, Vince the Vet., and Fred the Feeder are respectively members of the temperature controller, veterinarian, and feeder subclasses.

Once the list of current zoo keepers has been returned to object Zelda, object Zelda instructs each zoo keeper in the list to check the animals by calling the check_animals( ) operation of each zoo keeper object [only the call to Tina the Temp. Checker is shown—step 3]. Note that object Zelda did not need to understand the types of zoo keepers that were in the zoo keeper list, the number of zoo keeper objects in the list, or the specialized characteristics of any one zoo keeper object. Object Zelda uses the same interface (i.e., the check_animals( ) operation) to communicate with each zoo keeper object. It is then up to the individual zoo keeper objects to perform the task for which they have been created. Each zoo keeper object performs its assigned task through use of its own check_animals( ) operation. For example, object Tina's check_animals( ) operation retrieves a list of current animals from the animal registry object by calling the list_animals( ) operation [step 4] and then a list of containment units from the containment unit register object by calling the list_cont_units( ) operation [step 6]. Upon examining the animal list, object Tina's check_animals( ) operation determines that there are only two animals currently registered in the zoo, Sam the Snake [object 728] and Simba the Lion [object 718].

Object Tina's check_animals( ) operation then calls the get_temp_range( ) operations to get temperature ranges from objects Sam and Simba [steps 8 and 10]. Once the temperature ranges have been returned, the check_animals( ) operation of object Tina determines which containment units house the respective animals (i.e., Simba and Sam) and then calls the adjust tempo operation of the appropriate containment unit (i.e., Lion Cage 7 in the case of object Simba and Snake Pit 3 in the case of object Sam) to adjust the temperature of the containment units [steps 12 and 13].

The adjust_temp( ) operation of each containment unit then completes the control flow by proceeding to adjust the temperature in a way that is appropriate for the animals contained in each containment unit. (That is, the temperature is adjusted based on time and temperature for Snake Pit 3 and based on time alone for Lion Cage 7.) Note that the relationship between the check_animals( ) operation and the adjust temp( ) operations is polymorphic. In other words, the check_animals( ) operation of object Tina does not require specialized knowledge about how each adjust_temp( ) operation performs its task. The check_animals( ) operation merely had to abide by the interface and call the adjust_temp( ) operations. After that, it is up to the individual adjust_temp( ) operations to carry our their tasks in the proper manner.

The ZAF mechanism is an extremely simplistic framework mechanism that has been presented here to help novice readers understand some basic framework concepts so as to best appreciate the benefits and advantages of the present invention. These benefits and advantages will become more clear upon reference to the following Detailed Description.

DETAILED DESCRIPTION

Figure 8:
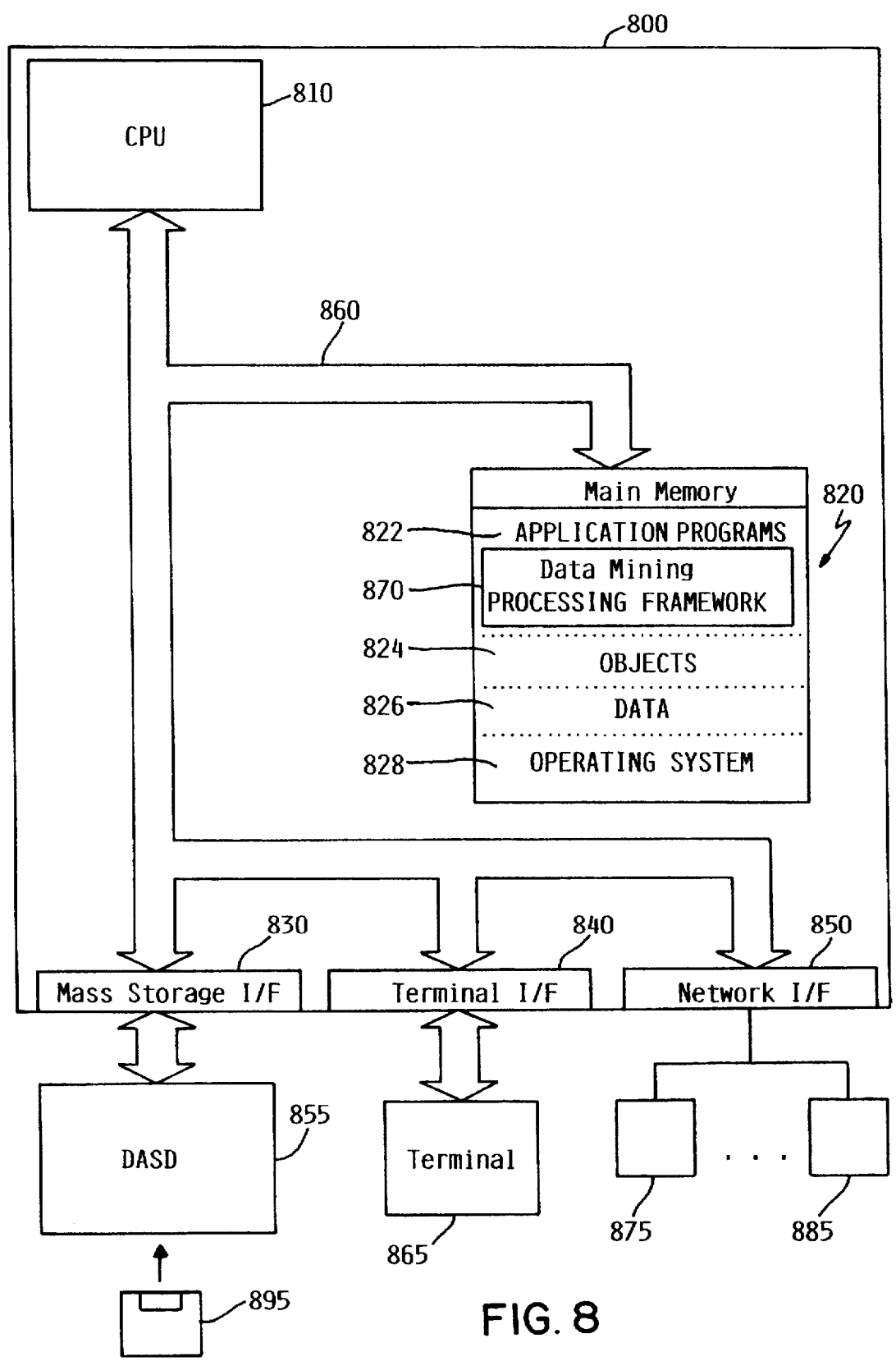
FIG. 8 is a block diagram of the computer system used in the preferred embodiment.

Turning now to the drawings, FIG. 8 shows a block diagram of the computer system of the preferred embodiment. The computer system of the preferred embodiment is an enhanced IBM AS/400 computer system. But the mechanisms and apparatus of the present invention apply equally to any computer system, regardless of whether the computer system is a complicated multi-user computing apparatus or a single user workstation. As shown in the exploded view of FIG. 8, computer system 800 comprises main or central processing unit (CPU) 810 connected to main memory 820, terminal interface 840, mass storage interface 830, and network interface 850. These system components are interconnected through the use of system bus 860. Mass storage interface 830 is used to connect mass storage devices (such as DASD device 855) to computer system 800. One specific type of DASD device is a floppy disk drive, which may store data to and read data from floppy diskette 895.

Main memory 820 contains application programs 822, objects 824, data 826, and operating system 828. Computer system 800 utilizes virtual addressing mechanisms that allow the programs of computer system 800 to behave as if they only have access to a large, single storage entity instead of access to multiple, smaller storage entities such as main memory 820 and DASD device 855. Therefore, while application programs 822, objects 824, data 286, and operating system 828, are shown to reside in main memory 820, these programs are not necessarily all completely contained in main memory at the same time. The term "computer system memory" is used herein to generically refer to the entire virtual memory of computer system 800.

Operating system 828 is any suitable multitasking operating system such as OS/400; however, the spirit and scope of the present invention is not limited to any one operating system. Operating system 828 preferably supports an object oriented programming environment, such as that provided, for example, by the C++ programming language. One or more application programs 822 provide a programming environment for computer system 800, and include a data mining framework mechanism 870, which is preferably an object oriented framework mechanism. But, framework mechanism 870 may exist anywhere in the virtual memory space of computer 800. Data mining framework mechanism 870 contains instructions capable of being executed on CPU 810.

Although computer system 800 is shown to contain only a single main CPU and a single system bus, the present invention may be practiced using a computer system that has multiple CPUs, and/or multiple buses, whether contained in a single unit or distributed across a distributed processing computer system. In addition, the interfaces that are used in a preferred embodiment each include separate, fully programmed microprocessors that are used to off-load compute-intensive processing from CPU 810. But the present invention applies equally well to computer systems that simply use I/O adapters to perform similar functions.

Terminal interface 840 is use to connect one or more terminals 865 to computer system 800. These terminals 865, which may be non-intelligent or fully programmable workstations, are used to allow system administrators and users to communicate with computer system 800.

Network interface 850 is used to connect other computer systems and/or workstations (e.g., 875 and 885 in FIG. 8) to computer system 800 in network fashion. The present invention applies equally no matter how computer system 800 may be connected to other computer systems and/or workstations regardless of whether the connection to the network is made using present-day analog and/or digital techniques or via some networking mechanism of the future. The presence of network interface 850 within computer system 800 means that computer system 800 may engage in cooperative processing with one or more other computer systems or workstations. Thus, the programs shown in main memory 820 need not necessarily all reside on computer system 800. For example, one or more programs of application programs 822 may reside in another system and engage in cooperative processing with one or more programs that reside on computer system 800. This cooperative processing could be accomplished through use of one of the well-known client-server mechanisms such as remote procedure call (RPC).

While the present invention has been (and will continue to be) described in the context of a fully-functional computer system, the present invention is capable of being distributed as a program product via floppy diskette (e.g., 895 of FIG. 8), via CD ROM, or via any another form of recordable media, such as any type of electronic transmission mechanism.

The invention avoids many of the problems of prior art data mining systems by providing a data mining framework that is extensible with relative ease to support new data mining strategies and functions. In the preferred embodiment, the data mining framework is provided as an integral part of a relational database system, such as DB2, a product of International Business Machine Corporation. The data mining framework provides support in the data base system for users to perform data mining operations. With the data mining framework and the relational database system, there are two levels of extensibility for the framework. The first level is for application programmers, who may develop new or improved data mining algorithms or techniques. The provider of the relational data base systems may choose to support certain data mining functions as part of the base capabilities of the system. In the alternative, third parties may provide new or improved data mining functions by extending the data mining framework. For example, the framework provider may support back propagation neural networks for performing classification functions. Or, a third party might choose to extend the framework by adding a decision tree classifier to the framework. Further, the third party could interface with the framework, making use of the data input/output, scripting, and inferencing capabilities, while extending the knowledge discovery or mining algorithm.

Another significant benefit of the framework of the preferred embodiment is the ability to control data mining functions using a technique known as scripting. Scripting is an easy way to allow users to customize the operations of applications or to control sequence of operations. The framework provides a functionally rich scripting language that allows instantiation of mining objects, instantiation of data connections between mining objects, and procedural control of the mining sequences.

Figure 9:
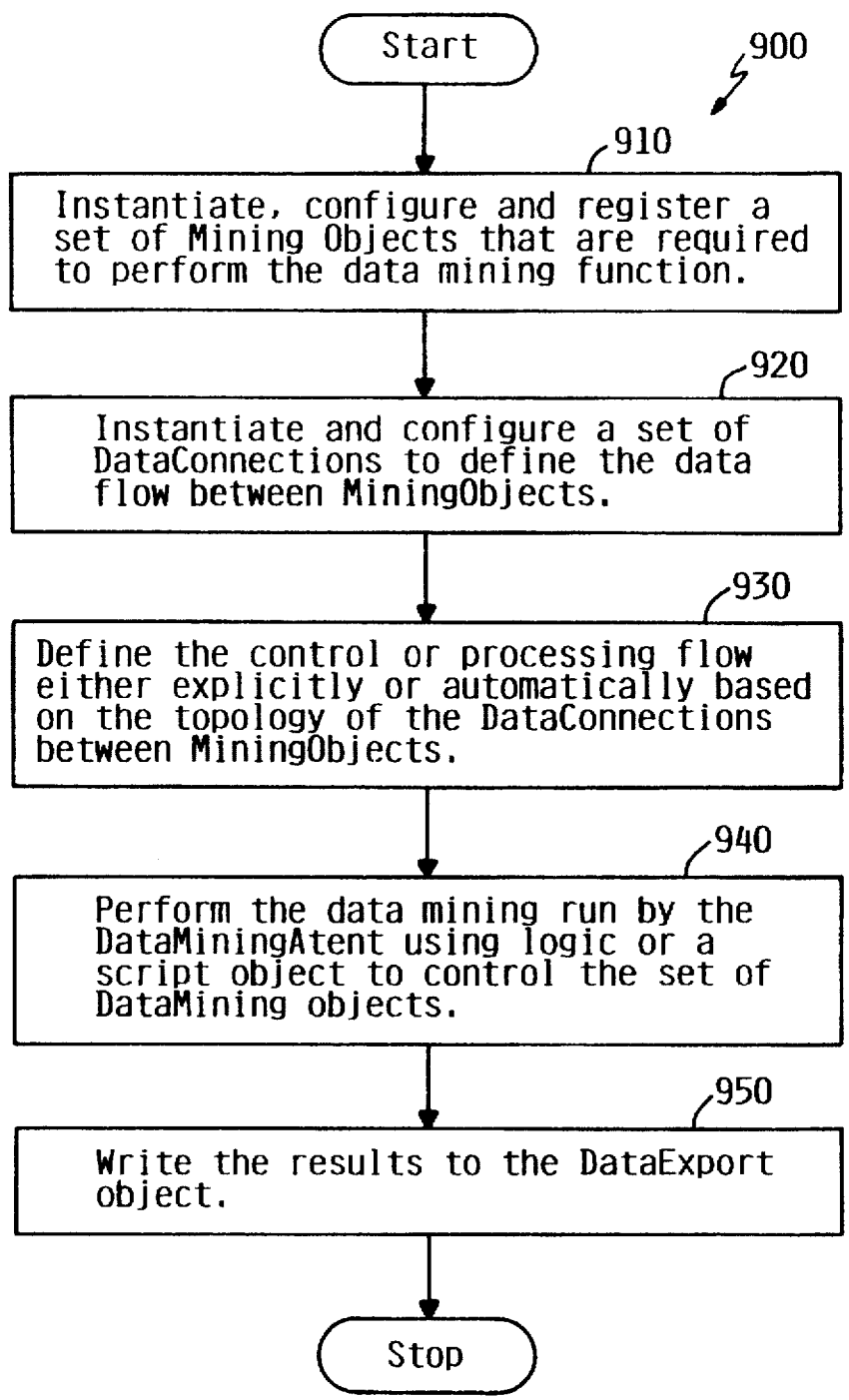
FIG. 9 is a flow diagram showing steps used in the preferred embodiment to perform core function of the framework mechanism of the preferred embodiment.

Referring to FIG. 9, the core functions of framework mechanism 870 in accordance with the preferred embodiment are represented by a series of steps in method 900. At block 910, framework 870 instantiates, configures, and registers a set of MiningObjects, which are required to perform the data mining function. The set of MiningObjects includes at least one DataImport object functioning as a data source, at least one DataExport object to write the data mining results to, and one or more knowledge discovery objects, e.g. a neural network, which will discover the results. The set of MiningObjects may optionally include one or more DataFilter objects, which could transform or scale the data from the DataImport object, one or more Inferencing objects (such as the FuzzyRuleBase Object), which could evaluate the effectiveness of the knowledge discovery mechanism, and one or more Script objects (such as the ControlScript object), which could control the data mining operation. At block 920, framework 870 instantiates and configures a set of DataConnections to define the data flow between MiningObjects. At block 930, framework 870 defines the control or processing flow either explicitly or automatically based on the topology of the data connections between MiningObjects. At this point, framework 870 has created a functional DataMiningAgent.

At block 940, the DataMiningAgent created above by framework 870 performs a data mining run, which consists of one or more passes over the data to discover the implicit, underlying relationships in the data, using either coded logic, e.g., C++ or Java code, a Script object to control the set of DataMining objects, or some combination of the two. When the DataMiningAgent at block 940 determines that the data mining run is complete, the results are written to the DataExport object as shown at block 950. While the specific implementation of each block of method 900 will vary according to the desired data mining function and the specific extensible functions provided by the framework user, method 900 is an illustration of several processing steps that may be performed for a large number of different data mining functions implemented within a single framework.

Class Definitions

Figure 10A:
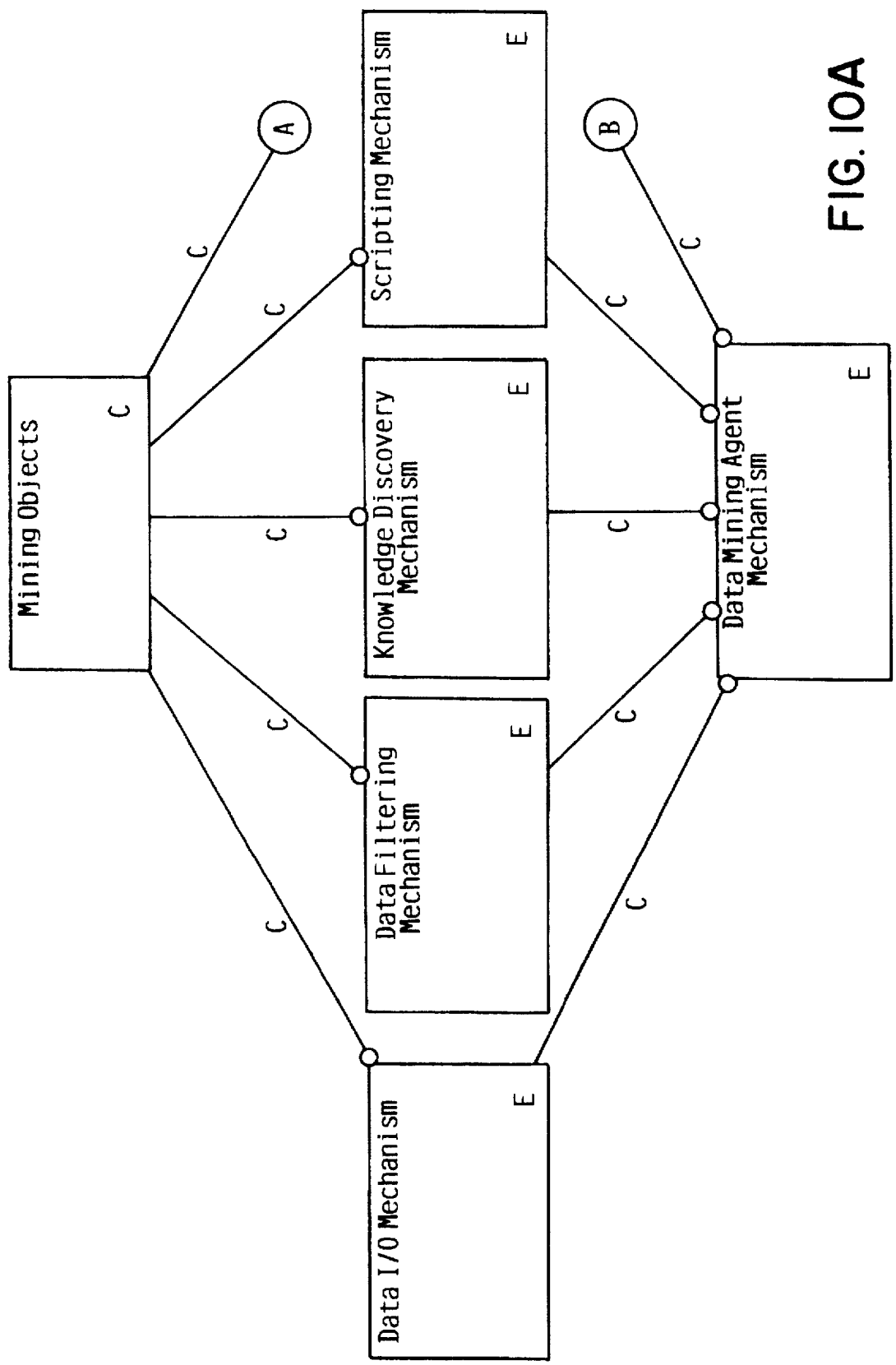
FIG. 10 is a category diagram of a framework mechanism constructed in accordance with the teachings of the preferred embodiment.
Figure 10B:
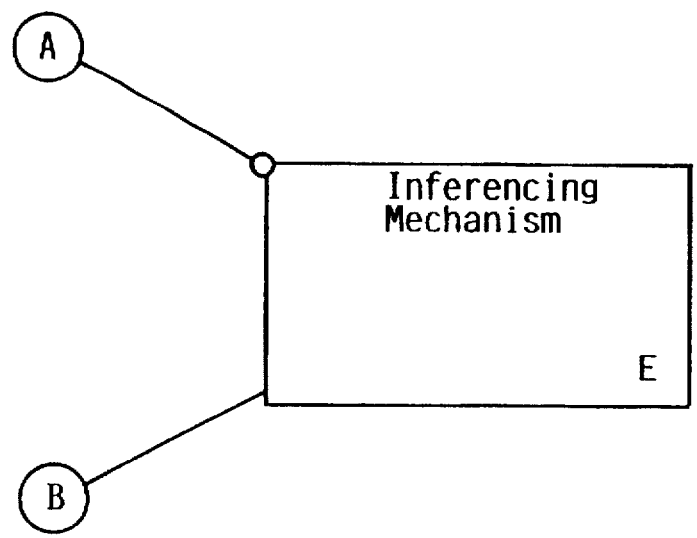

FIG. 10 is a category diagram of data mining framework mechanism 870 in accordance with the preferred embodiment. The categories shown in FIG. 10 represent collections of Object Oriented Programming (OOP) objects that encapsulate data attributes and behaviors or methods and are stored in main memory 820 of computer system 800. These objects may be implemented, for example, in a computer system operating environment that supports the C++ or Java programming languages.

The classes have been broken into seven categories: the Mining Objects category, the Data I/O Mechanism category, the Data Filtering Mechanism category, the Knowledge Discovery Mechanism category, the Scripting Mechanism category, the Inferencing Mechanism category, and the Data Mining Agent mechanism category. Mining Objects is a core category, as indicated by the "C" label, meaning that the classes in these categories may not be modified by a user of framework 870. The remaining categories are extensible categories, as indicated by the "E" label, meaning that users may extend the classes in these categories by defining and implementing classes that are subclasses of framework 870 defined classes. The Data Mining Agent mechanism has a using relationship with the Data I/O Mechanism, the Data Filtering mechanism, the Knowledge Discovery Mechanism, the Scripting Mechanism, and the Inferencing Mechanism, all of which have a using relationship with the Mining Objects Mechanism. The relationships between all the categories are core relationships, as indicated by the "C" label, meaning that the framework user cannot modify these relationships.

Figure 11B:
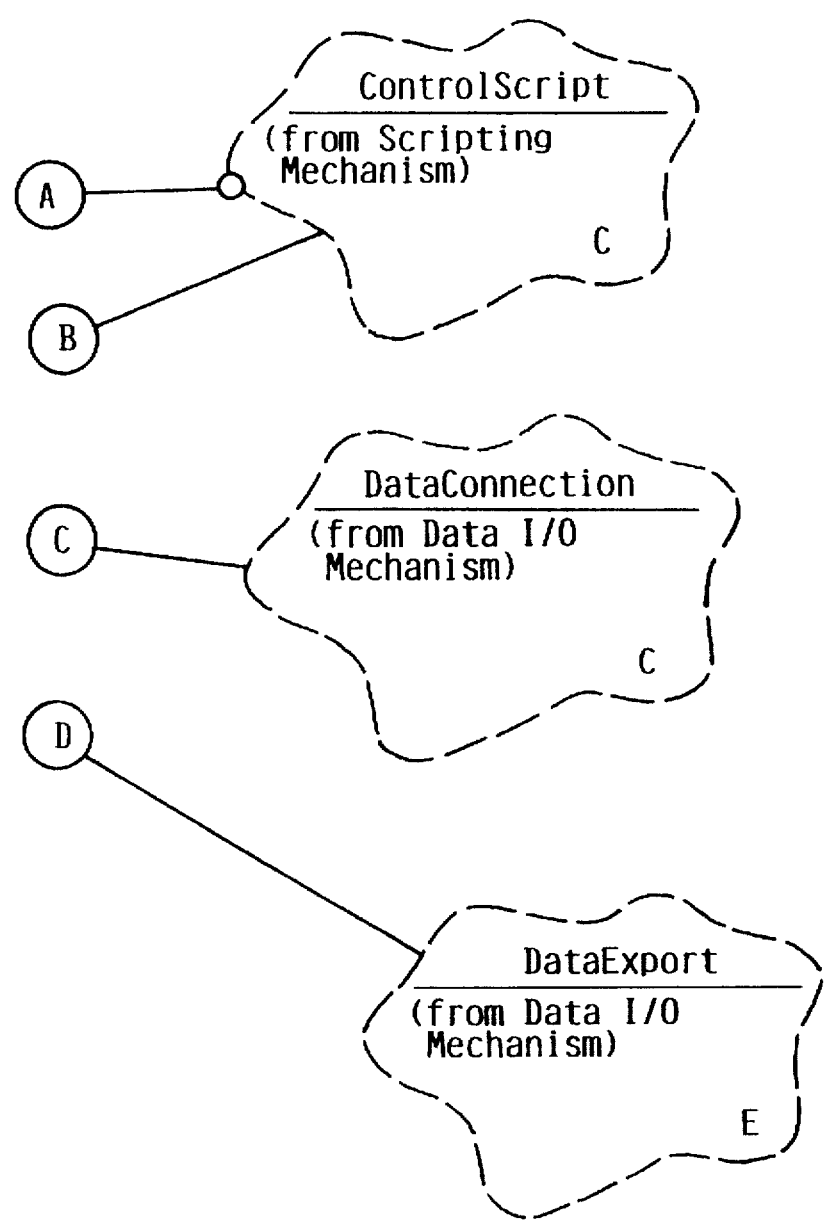
FIGS. 11–18 are class diagrams of a framework mechanism constructed in accordance with the teachings of the preferred embodiment.

FIG. 11 is a top level class diagram of the classes used to implement data mining framework 870. The categories to which the classes belong are identified below the class names. The MiningObject class belongs to the Mining Objects category. The DataMiningAgent class belongs to the Data Mining Agent Mechanism. Members of the Data I/O Mechanism category include: DataImport, DataExport, and DataConnection. The DataFilter class belongs to the Data Filtering Mechanism category. The NeuralNetwork class belongs to the Knowledge Discovery Mechanism category.

The FuzzyRuleBase class belongs to the Inferencing Mechanism category. The ControlScript class belongs to the Scripting Mechanism category.

The MiningObject, DataConnection, FuzzyRuleBase, and ControlScript classes are core. All the other classes in FIG. 11 are extensible. All the relationships in FIG. 11 are core. The MiningObject and NeuralNetwork classes are abstract classes, meaning that no instances are ever created. The DataMiningAgent class has a using relationship with all the classes in FIG. 11 except for the MiningObject class since the DataMiningAgent class is a subclass of the MiningObject class. The ControlScript class has a using relationship with the MiningObject class.

The key methods provided are not shown in FIG. 11, but are shown in subsequent figures. These methods provide extensible interfaces that allow a user of the framework to take advantage of the flexibility and power of the framework by easily adapting the framework to new or different data mining techniques. The specific implementation shown in the figures for the classes are shown for the purpose of illustration, and a framework user may select alternative implementations by overriding extensible methods within the scope of the present invention.

The framework of FIG. 11 may be used by subclassing from the extensible classes (denoted by "E"); thus, a user of the framework may extend the framework by defining a subclass of, for example, DataImport, thereby adding the ability to read and mine data from relational data bases other than DB2 of the preferred embodiment. Also, the user could extend the framework by, for example, adding an additional or improved knowledge discovery algorithm by subclassing the MiningObject, DataMiningAgent, or NeuralNetwork classes.

Figure 12A:
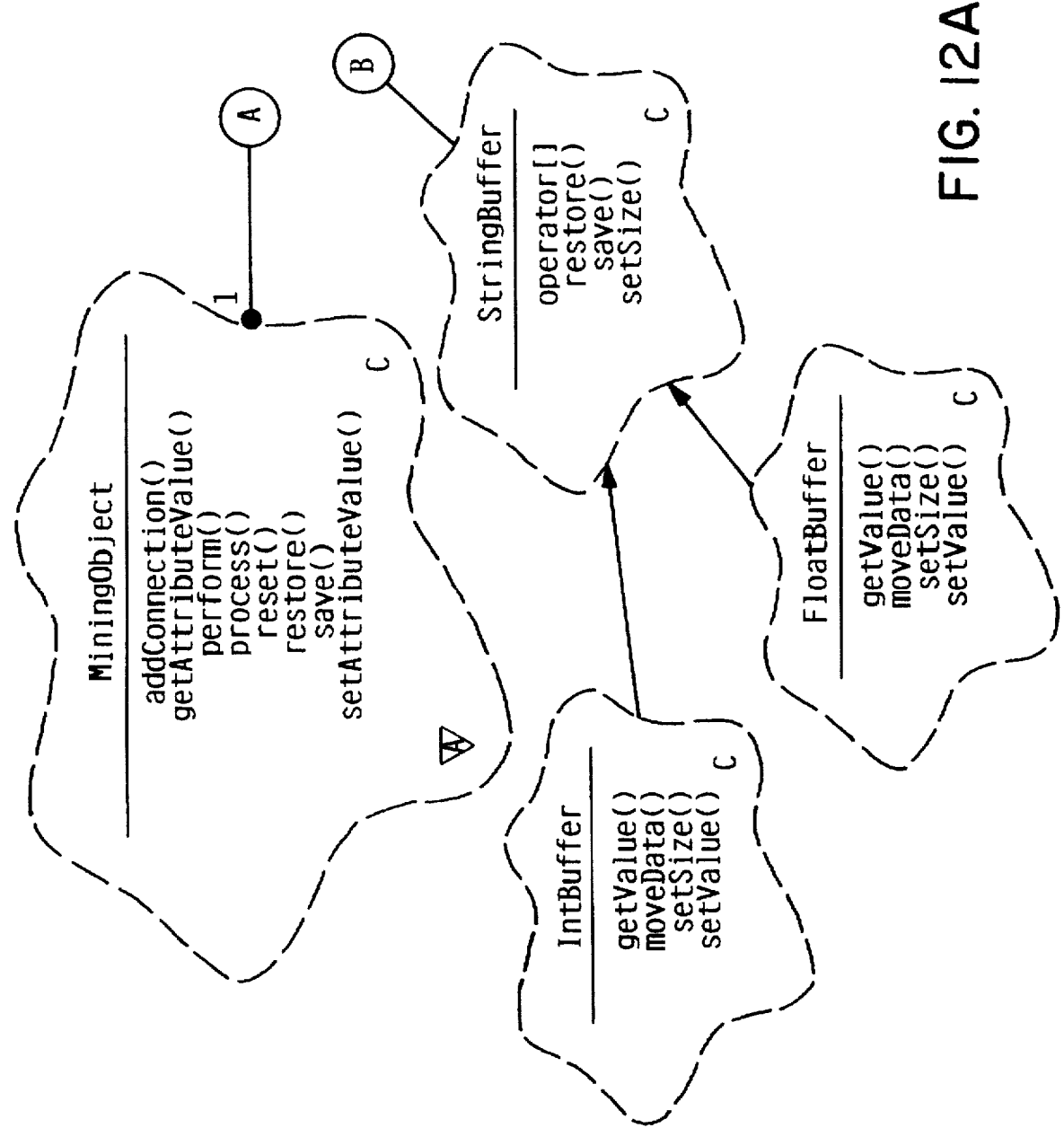
Figure 12B:
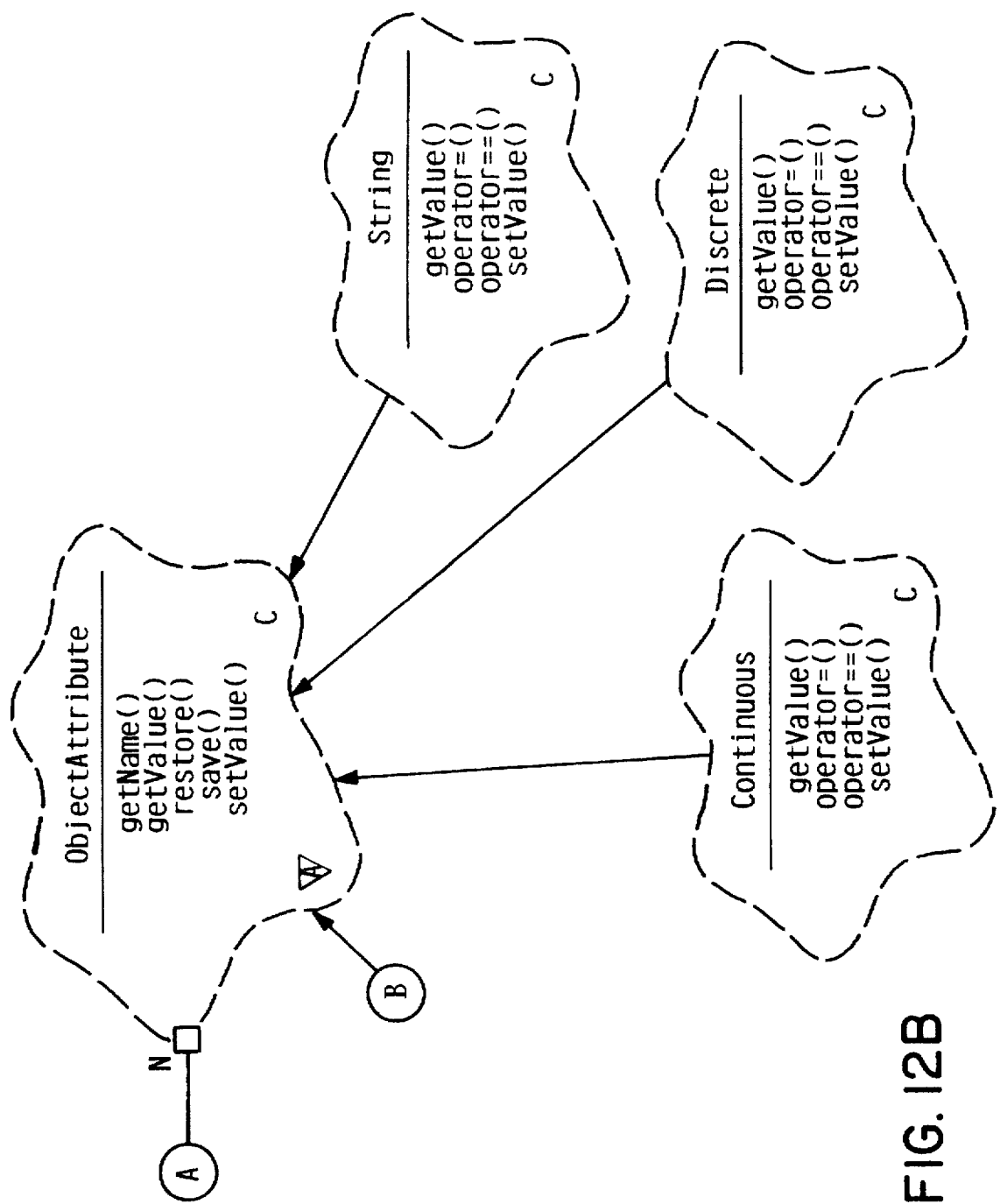

A class diagram of the classes in the MiningObjects category is shown in FIG. 12. The abstract MiningObject class defines a generic interface for constructing DataMiningAgents. Because the DataMiningAgent class is a subclass of MiningObject it can be treated as a constituent of a larger, more powerful type of MiningObject. This architecture allows application-specific agents to be constructed from other MiningObject software agents in a hierarchical manner. The ObjectAttribute class is provided as a generic data member, which is universally accessible via the MiningObject getAttributeValue( ) and setAttributeValue( ) methods.

The self-similar relationship between MiningObjects and MiningAgents provide a flexible object-oriented framework for developing data mining applications. The perform( ) method and the associated ActionList, allow the framework user to extend the MiningObject behavior by defining new methods in the MiningObject subclass, and making them publicly available; thereby making the new behavior accessible to the ControlScript class as well as other MiningObjects.

MiningObject is an abstract, core class, and no instances of the MiningObject class are ever created. The MiningObject class defines the interface used between mining objects in data mining framework 870. A MiningObject contains a list of ObjectAttributes (i.e., the MiningObject class has a containment by reference relationship to the ObjectAttribute class), which defines a set of parameters or data members of the object. Each MiningObject must provide the following methods: perform( ), process( ), reset( ), save( ), and restore( ). Each MiningObject also contains an action list string, which contains the names of a set of methods which can be invoked through the perform( ) method. This enables those methods to be called by ControlScripts or FuzzyRuleBase objects.

The MiningObject addConnection( ) method is used to register a DataConnection object with the MiningObject instance, so that when the DataConnection object is instantiated it registers itself with the two MiningObjects is it is connecting.

The MiningObject perform( ) method is an architected way for the user to modify the framework and to extend it to call new methods that the user provides. It is primarily designed for the ControlScript class.

The save( ) and restore( ) methods provide object persistence. The save( ) method saves the mining object to storage. The restore( ) method restores the attributes of the mining object from storage. The reset( ) method re-initializes the mining object. The exact behavior of each method is defined by the appropriate subclass.

The MiningObject process( ) method is a virtual method that will be overridden by the process methods specified by the subclasses of the MiningObject class.

The getAttributeValue( ) and setAttributevalue( ) methods are used to read and modify the attributes of the other classes in FIG. 12. An example of an attribute for a neural network could be what mode the neural network is in, i.e., whether the neural network is in train, test, or run mode.

The ObjectAttribute class is an abstract, core class of the framework and no instances of the ObjectAttribute class are ever created. Subclasses of ObjectAttribute include StringBuffer, String, Discrete, and Continuous, which are all also core classes. FloatBuffer and IntBuffer are subclasses of the String Buffer class and are also core classes of the framework. The ObjectAttribute class provides getName( ), getValue( ) and setValue( ) methods as well as save( ) and restore( ) methods for persistence.

The String class is a subclass of ObjectAttribute where the attribute value is a character string. All of the methods in the ObjectAttribute class are virtual methods that will be overridden by the specific methods in the subclasses. The Discrete class is a subclass of ObjectAttribute where the attribute value is an integer value. The Continuous class is a subclass of ObjectAttribute where the attribute value is a floating point value. The String, Discrete, and Continuous classes all provide getValue( ), operator=( ), operator==( ), and setValue( ) methods. The getValue( ) and setValue( ) methods provide an access mechanism for the values of the suing data elements of the object. The operator=( ) method does an assignment of elementary data. The operator==( ) method is an equality operator of the elementary data in the member.

A set of buffer classes are also defined as ObjectAttributes. The StringBuffer class is a subclass of ObjectAttribute where the attribute value consists of an array of Strings.

The StringBuffer core class provides operator[], restore( ), save( ), and setSize( ) methods. The operator[] method provides array notation for accessing individual elements of the buffer. The save and restore( ) methods allow the objects to be saved and restored to and from storage for object persistence. The setSize( ) method is used to set the size of the array.

FloatBuffer and IntBuffer are core subclasses of StringBuffer where the attribute value consists of an array of floats or integers respectively. Both the IntBuffer and FloatBuffer classes provide getValue( ), moveData( ), setSize( ), and setValue( ) methods. The getValue( ) and setValue( ) methods provide an access mechanism for the values of the data elements of the object. The moveData( ) method is used by DataConnection objects to efficiently move the elementary data types from one buffer to another. The setSize( ) method is used to set the size of the buffer.

Figure 13:
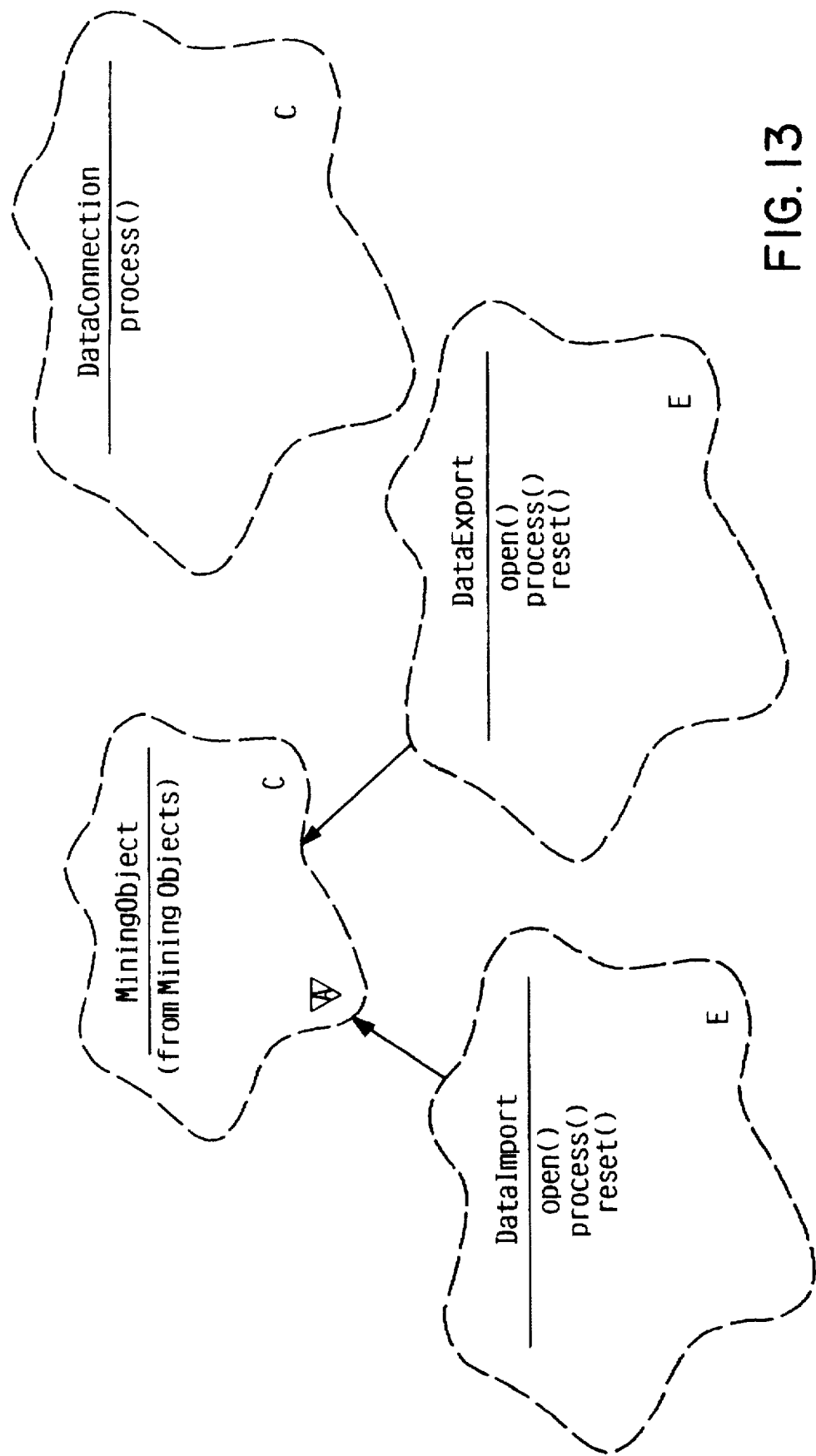

FIG. 13 depicts the Data I/O category, which includes the DataImport, DataExport, and DataConnection classes of the framework.

DataImport and DataExport are extensible subclasses of the abstract, core MiningObject class, and they support the standard MiningObject interfaces. The DataImport class defines extensible methods open( ), process( ), and reset( ). The DataImport class defines the data source from which underlying information is to be discovered. In the preferred embodiment, DataImport supports data access from flat (text) files and from the DB2 relational databases. But a variety of alternative data import objects could be used, such as spreadsheets or other databases such as any ODBC compliant database under Microsoft Windows.

The DataExport class defines the data object into which those discovered underlying relationships will be output. The DataExport class defines extensible methods open( ), process( ), and reset( ).

The DataConnection core class defines the process( ) method for moving data between buffers. The FloatBuffer, IntBuffer, and String classes in FIG. 12 are examples of the different types of buffers that can be supported.

The open( ) method in both DataImport and DataExport opens the data source or target for input or output, respectively. The reset( ) method re-initializes the data source or target by closing and then re-opening.

The process( ) method in the DataImport class reads data from the data source. The process( ) method in the DataExport class writes the data mining results to data destination. The process( ) method, as implemented in the preferred embodiment, uses the DataConnection to provide data flow between MiningObjects in the framework. A DataConnection instance can be created by specifying two existing MiningObjects and the names of respective Buffer attributes. For example, the process( ) method in the Data-Connection object can move the data from the DataImport object to the DataFilter object, and from the DataFilter object to the DataExport object.

Figure 14:
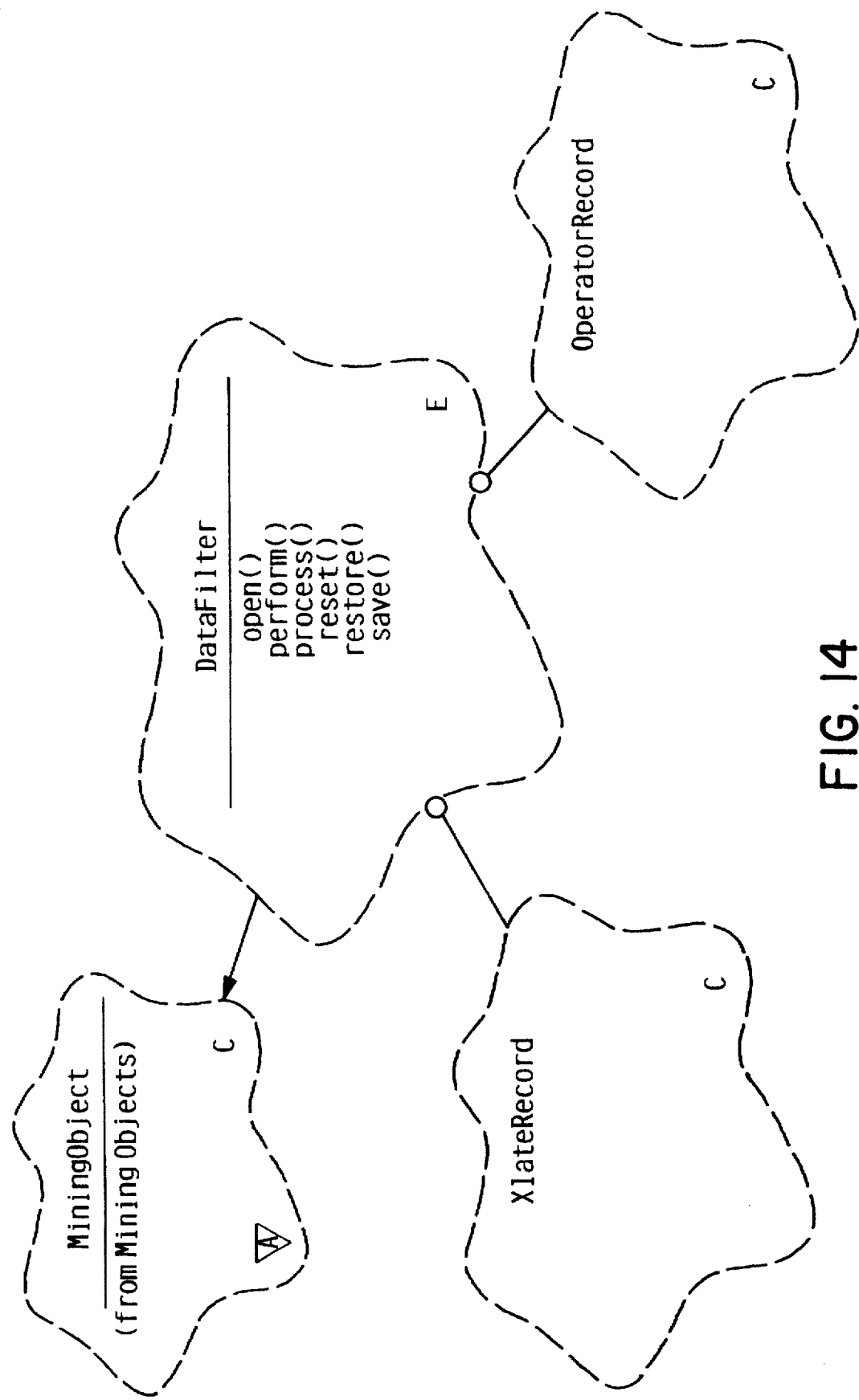

FIG. 14 shows the Data Filtering Mechanism classes, which include the DataFilter class (subclassed from MiningObject) and its utility classes including XlateRecord and OperatorRecord. The DataFilter class has a using relationship with the XlateRecord and OperatorRecord classes. The DataFilter class is extensible while XlateRecord and OperatorRecord are core. The DataFilter class includes the following methods: open( ), perform( ), process( ), reset( ), restore( ), and save( ).

The purpose of the DataFilter class, accomplished via the process( ) method is to transform, translate, or scale the data as it comes from the DataImport object to the knowledge discovery mechanism. Analogously, the DataFilter class also transforms, translates, or scales the results as they are output to the DataExport object.

The open( ) method of the DataFilter class opens and loads a translate template file that contains a set of data definitions and data transformation and data scaling specifications. In the preferred embodiment, these data translation and scaling operations are designed to support neural network knowledge discovery techniques. But, any required data transformation could be performed through subclassing the DataFilter object or the MiningObject classes.

As the translate template is loaded, a set of XlateRecords and OperatorRecords is created. Each XlateRecord instance corresponds to a single data field and specifies the source data type, destination data type, and pre or post-operators. OperatorRecord defines an operator, such as scale, truncate, or name mapping, and any associated parameters. The DataFilter object could provide support for simple data cleansing operations through default symbol substitutions for categorical data and thresholding to remove outliers for numeric data when the valid range of values is known. The DataFilter object can provide a set of operations for data pre and post processing. Data types could include such types as symbols, numbers, vectors of numbers, one-of-N codes, binary codes, and thermometer codes.

An example of the transformation performed by the DataFilter object is scaling data for presentation to a neural network, and converting back on the output side. Most neural network models accept numeric data only in the range of 0.0 to 1.0 or −1.0 to +1.0, depending on the activation functions used in the neural processing elements. Consequently, data must be scaled down to that range. Symbol-to-number and number-to-symbol conversion could be handled through lookup symbol tables. Other DataFilter functions could include normalization and symbolic to numeric translations.

The perform( ) method makes any unique methods that the user has added to the action list scriptable and accessible from any other object. The reset( ) method reinitializes the DataFilter object by reloading the translate template in order to change how the data is being transformed, translated, or scaled. The save( ) method makes the DataFilter object persistent by streaming the constituent DataFilter object to storage. The restore( ) method restores the contents of the DataFilter object from storage.

Figure 15:
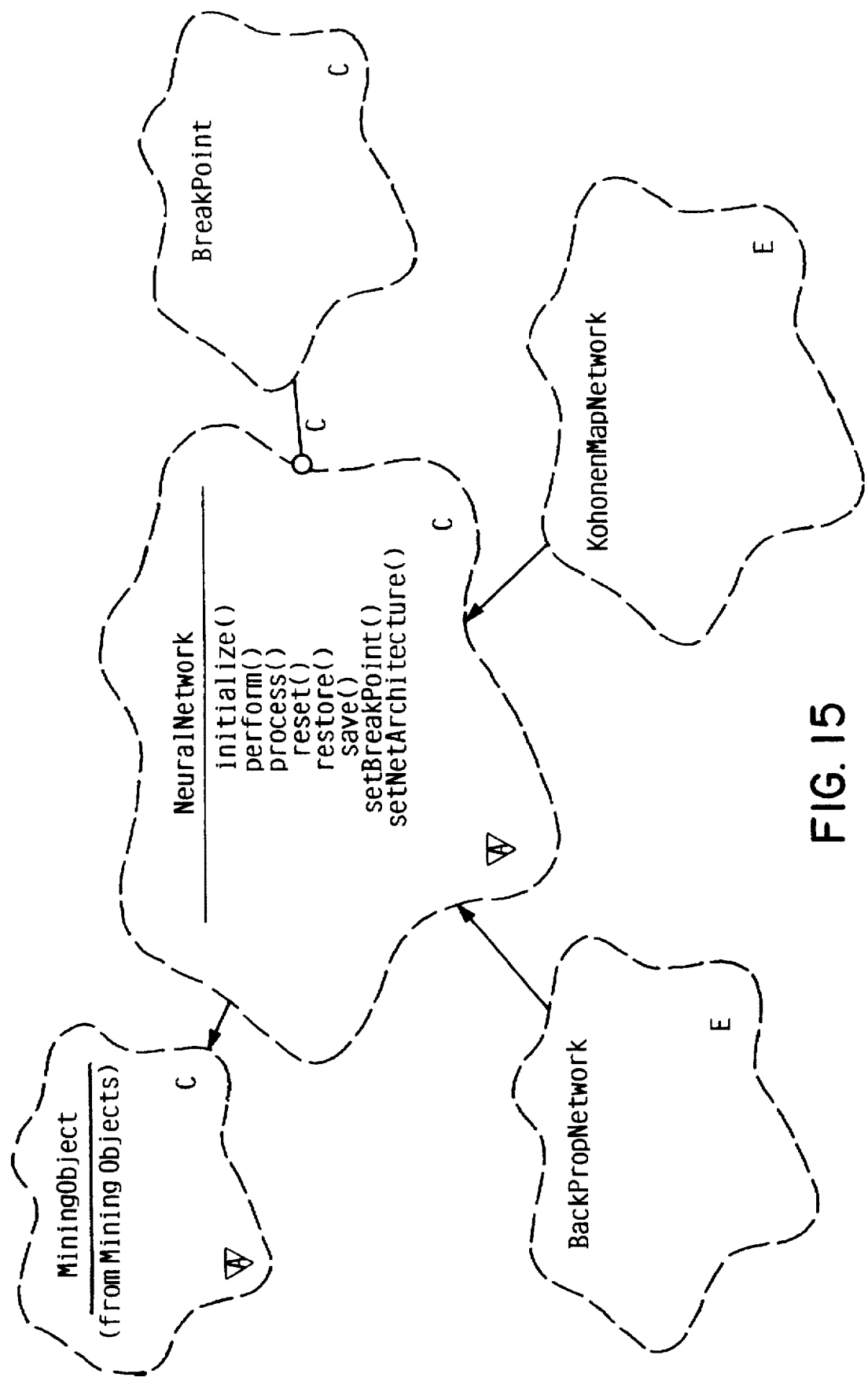

FIG. 15 shows an example of the Knowledge Discovery category and includes several classes. These include the abstract, core class NeuralNetwork, which is itself a subclass of MiningObject, plus the BackPropagationNetwork and KohonenMapNetwork classes, which are extensible subclasses of the NeuralNetwork class. The NeuralNetwork class has a using relationship with the Breakpoint class, which is a core class.

Although the back propagation neural network and the Kohonen map network are shown as examples of neural network models in the preferred embodiment, the user could extend the framework to use other neural networks models, such as limited recurrent back propagation, radial basis functions, adaptive resonance networks, temporal difference learning, and routing networks.

In addition, the knowledge discovery functions are not limited to neural networks. Other methods such as decision trees, rough sets, and statistical correlation or associations could be added via subclassing of the MiningObject class. Thus, any knowledge discovery function could be added through subclassing the MiningObject class.

The NeuralNetwork process( ) method will process the data based on the current mode. The NeuralNetwork class has a mode that can be training, testing, or running. In training mode, the process( ) method processes the data and updates the weights of the neural network according to the specific learning algorithm. In test mode, process( ) will run the data through the network without adjusting the weights, but will generate error information. In run mode, the process( ) method will process the data through the network, without adjusting the weights, and produce results, such as classification or prediction.

The NeuralNetwork setNetArchitecture( ) method sets the architecture of the neural network, such as number of inputs, number of outputs, and number of hidden layers and units.

The NeuralNetwork reset( ) method will reinitialize the network weights. The NeuralNetwork initialize( ) will prepare the neural network for processing data. The NeuralNetwork save( ) and restore( ) methods save and restore the network to and from storage, respectively.

The NeuralNetwork perform( ) method is an architected way for the user to modify the framework and to extend it to call new methods that the user provides.

The NeuralNetwork setBreakPoint( ) method is a control mechanism that works against ObjectAttributes for running the neural network. NeuralNetworks contain attributes such as a BreakPoint list, which is a set of conditions that can be specified to trigger script conditions.

Figure 16:
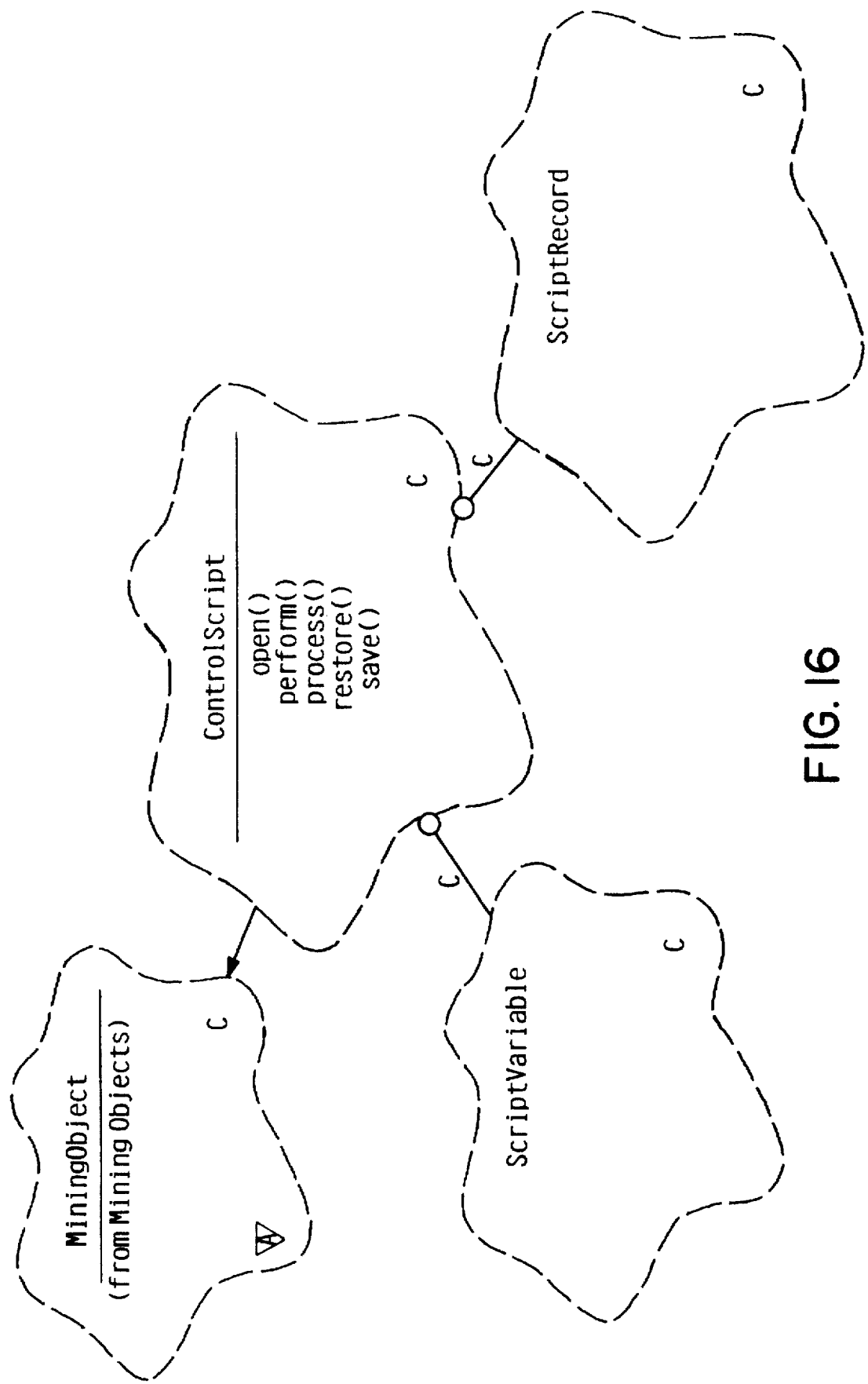

FIG. 16 shows the Scripting mechanism category, which consists of the extensible ControlScript class along with two utility classes ScriptRecord and ScriptVariable. All the relationships in FIG. 16 are core. ControlScript is a subclass of the MiningObject class.

The ControlScript class provides the following methods: open( ), perform( ), process( ), restore( ), and save( ). The save( ) and restore( ) methods save and restore the attributes of the ControlScript class and the script itself to and from storage, respectively. The perform( ) method is an architected way for the user to modify the framework and to extend it to call new methods that the user provides.

The open( ) method loads a script file, which consists of a sequence of script commands, and produces a set of ScriptRecords and ScriptVariables. The process( ) method processes the script records in the order specified by the control script, which provides the overall control for the data mining function. In the preferred embodiment, the ControlScript language provides an interpreted scripted language. It could have features such as variables, if-then-else statements, macros, while loops, and comments. The language could have commands for controlling the data source, locking or unlocking the network weights, setting training parameters, logging data, and turning Inspectors on and off. Variables could be used to build generic training scripts, which could be used over and over. The scripting language could allow common sequences of operations to be grouped together and called as a subroutine. Switching between training and testing data sources and conditionally logging test results are operations that could be automated using the scripting. In an alternative embodiment, the script function could be included in the DataMiningAgent class.

Figure 17:
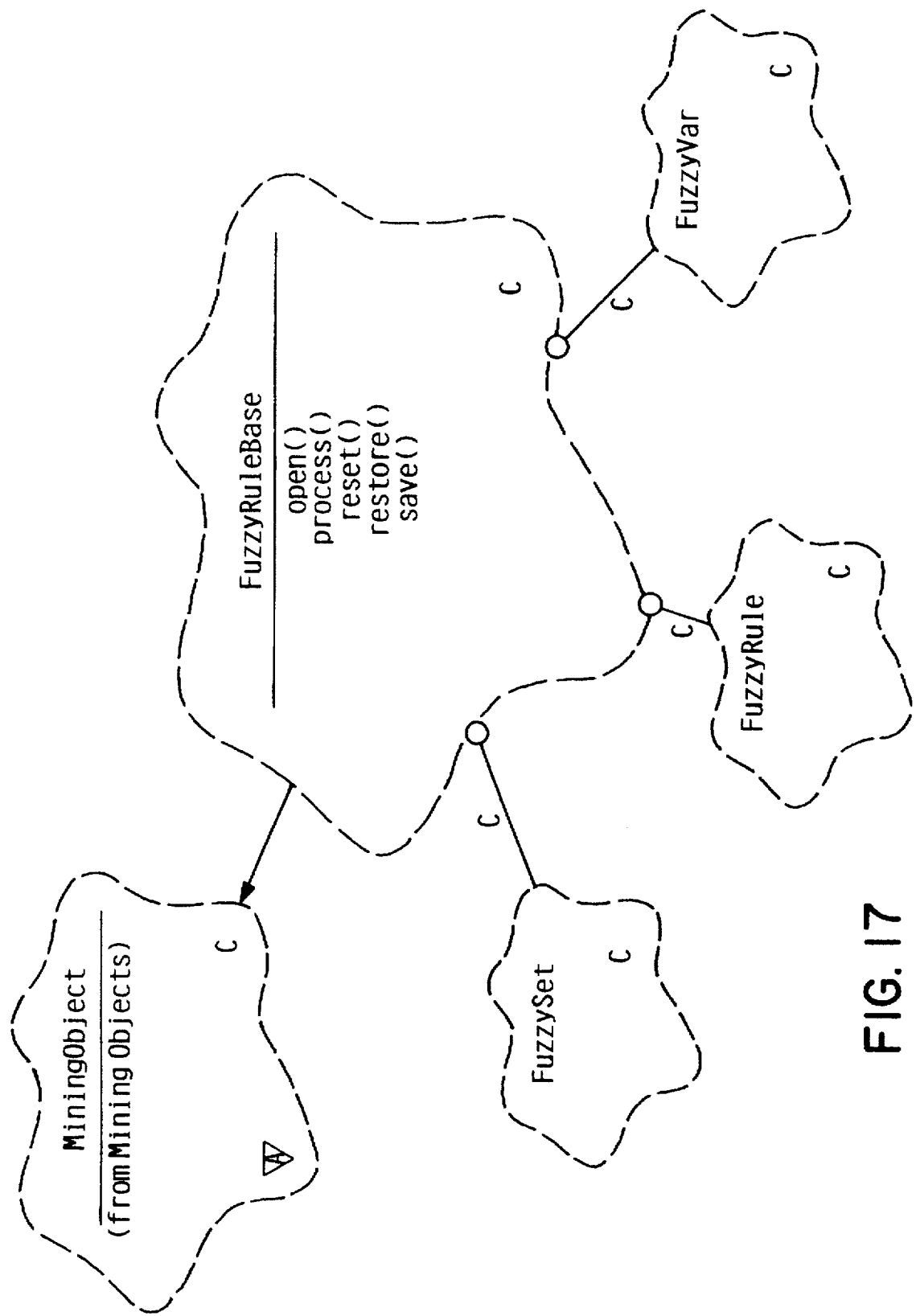

The Inferencing Mechanism category classes are shown in FIG. 17. This category includes the FuzzyRuleBase core class, which is a subclass of MiningObject, as well as FuzzyRule, FuzzySet, and FuzzyVar classes which are used by the FuzzyRuleBase class and are also core. The relationships between FuzzyRuleBase and FuzzySet, FuzzyRule, and FuzzyVar are core. But, the inferencing mechanism need not be based on fuzzy logic, and any other knowledge based processing mechanism could be used.

The FuzzyRuleBase open( ) method reads a rule base file and instantiates a set of FuzzyRule, FuzzySet, and FuzzyVariable objects. In the preferred embodiment, the domain knowledge is represented by a fuzzy rule language that allows definition of fuzzy variables, fuzzy sets and membership functions, and fuzzy if/then rules. Other knowledge representations and inferencing techniques could be added to this framework either through subclassing the MiningObjects abstract class.

The FuzzyRuleBase process( ) method adds domain knowledge to the DataMiningAgent class. An example of adding domain knowledge is to analyze the data from the DataImport class, and based on that analysis, choose the most effective knowledge discovery mechanism. It could choose between a variety of neural network models to find the most appropriate one for the data to be analyzed. After a neural network model has been chosen, the process( ) method could also choose from a variety of architectures for that neural network model. The FuzzyRuleBase process( ) method could also be written to pick from a variety of knowledge discovery mechanism types, such as the appropriateness of using an expert system as opposed to a neural network. Another example of adding domain knowledge is to choose data representation formats.

The FuzzyRules are the knowledge representation. Fuzzy rules could be made up of one or more antecedent clauses and single consequent clause. Each clause could be a fuzzy statement of the form: "FuzzyVar is FuzzySet" or "FuzzyVar=constant." The rule base could contain rules that depend on other rules in order to be valid. For example, one set of rules could compute the value of variable A. Another set of rules could use fuzzy variable A in their antecedents, in order to compute the value of the result or output variable B.

The clauses in the FuzzyRules refer to FuzzyVariables, which in turn are defined by one or more FuzzySets. The user can define fuzzy variables and their associated fuzzy sets and then specify a set of fuzzy if-then-else rules for processing the data. Fuzzy variables can be either discrete or continuous. Discrete variables can be either numeric or symbolic. The continuous variables might have multiple fuzzy sets defined over their domain. Fuzzy sets could be either trapezoidal, triangular, rectangular, or made up of arbitrary line segments.

The FuzzyRuleBase reset( ) method reloads a FuzzyRuleBase file and instantiate a new set of FuzzyRules, FuzzyVariables, and FuzzySets.

The FuzzyRuleBase save( ) and restore( ) methods save and restore the FuzzyRuleBase object to and from storage, respectively.

Figure 18A:
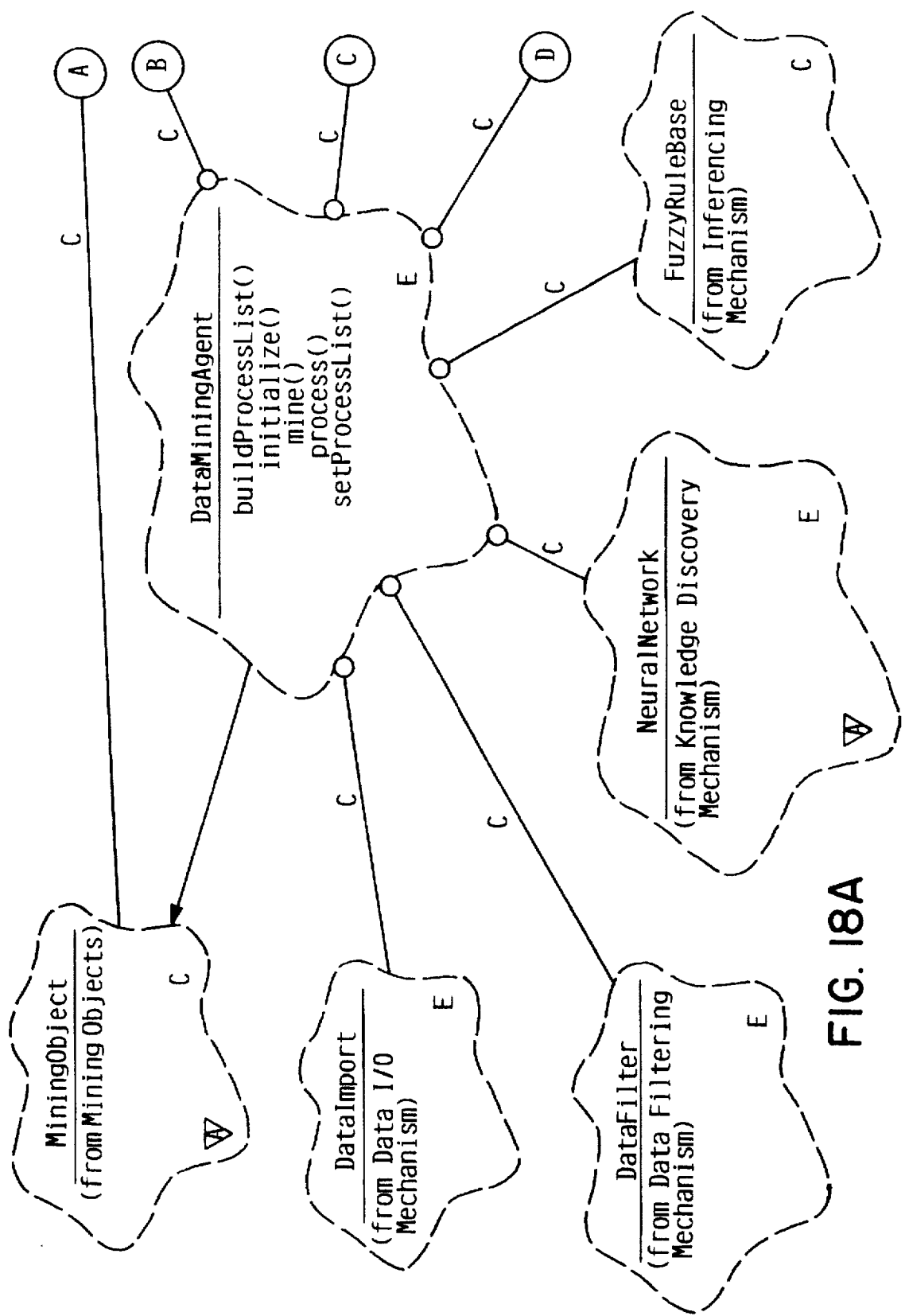
Figure 18B:
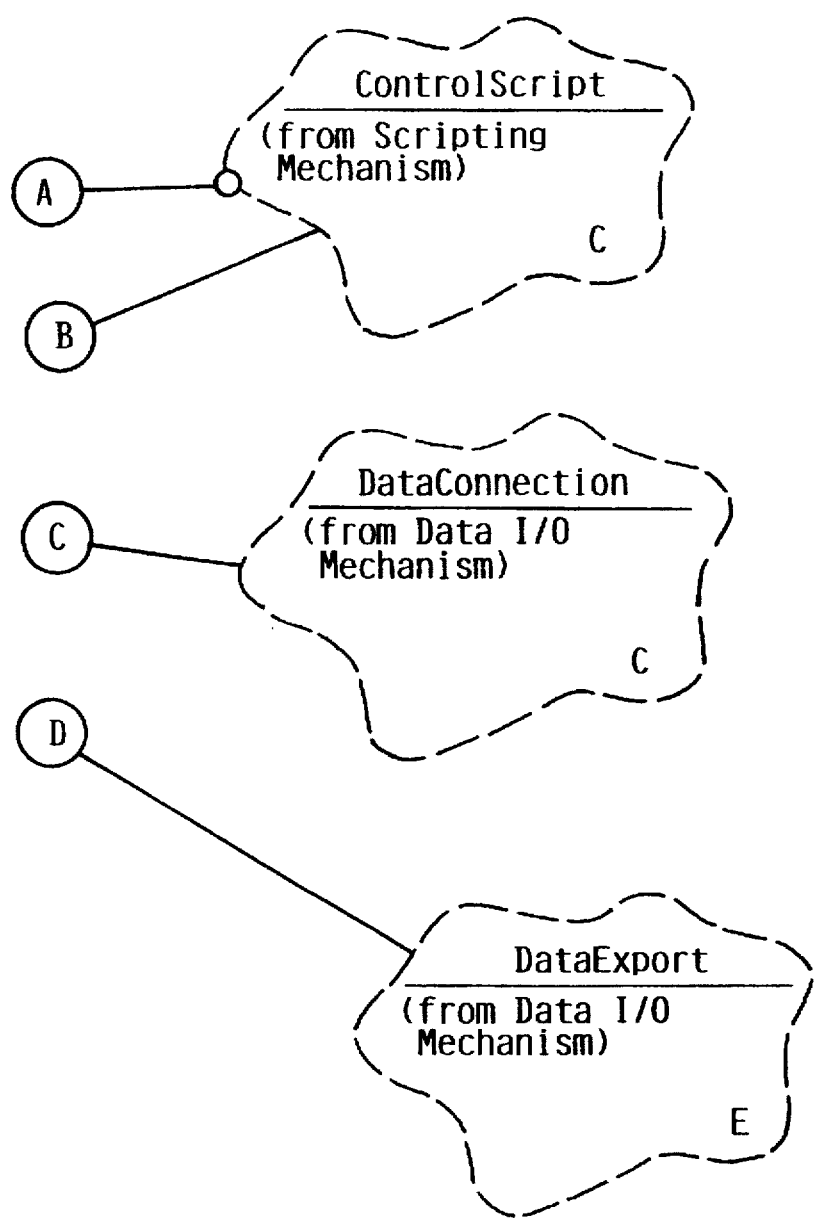

FIG. 18 shows the DataMiningAgent class, its major methods, and its relationship to other MiningObjects in the data mining framework. The DataMiningAgent class is a subclass of MiningObject and has using relationships with the DataImport, DataFilter, NeuralNetwork, FuzzyRuleBase, DataExport, ControlScript, and DataConnection classes. The ControlScript class has a using relationship with the MiningObject class. All of the relationships are core functions of the framework. The DataMiningAgent class defines extensible methods buildProcessList( ), initialize( ), mine( ), process( ), and setProcessList( ).

The buildProcessList( ) method determines the sequence of processing of the DataMining objects by examining the connections between the objects. It builds the process list, which contains a list of MiningObjects.

The initialize( ) method performs the functions shown in steps 910, 920, and 930 of FIG. 9. The mine( ) method in FIG. 18 performs the functions shown in steps 940 and 950 of FIG. 9.

The process( ) method executes the process list, built by the buildProcessList( ) method, in order by calling the process methods of all the MiningObjects that are in the process list.

The setProcessList method( ) is an alternative to buildProcessList( ) and allows the user to set the order that the MiningObject process methods will be called.

Core Function

FIG. 11 best distinguishes between core and extensible functions in the data mining framework of the present invention. Specifically, as noted above, MiningObject, FuzzyRuleBase, ControlScript, and DataConnection are the only core classes in FIG. 11. The rest of the classes in FIG. 11 are extensible. All class relationships shown in FIG. 11 are core relationships, and may not be modified by the user of the framework. In fact, it is the fixed character of these relationships between classes that characterizes a framework and makes it useful and powerful. The core function of the data mining framework is defined by the core classes and core class relationships, along with functional requirements that cause the framework to behave in the desired manner. As described above with respect to FIG. 9, the overall core function of the data mining frameworks includes the steps of method 900.

Object Interaction

An example will now be presented to illustrate how a data mining application may be constructed using the data mining framework disclosed herein. For the sake of clarity, the function of the data mining application will be described conceptually, followed by an example of how these concepts may be implemented using the object oriented data mining framework of the present invention to achieve the desired data mining application.

Figure 19A:
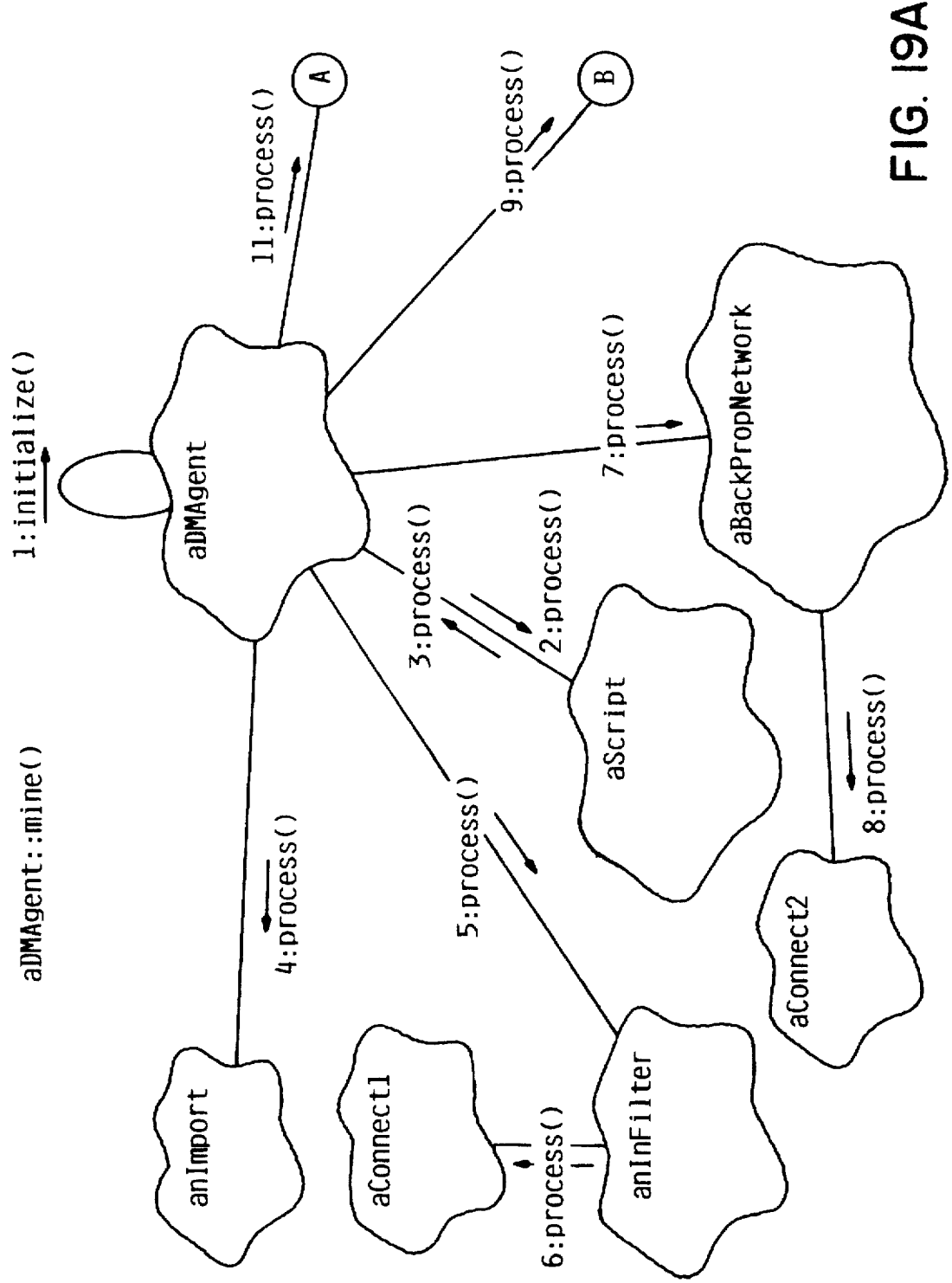
FIGS. 19–20 are object interaction diagrams of an example framework mechanism constructed in accordance with the teachings of the preferred embodiment.
Figure 19B:
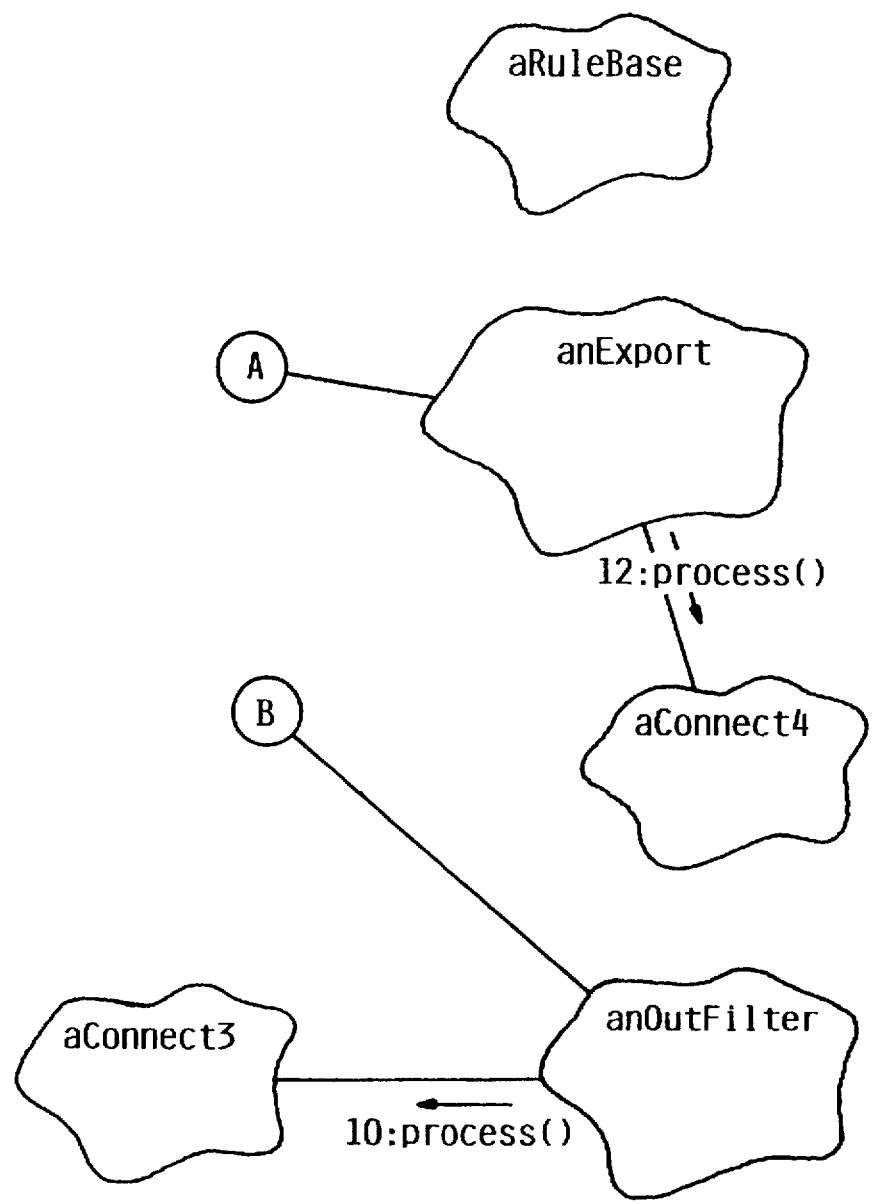

Referring to FIG. 19, a sample data mining application that uses neural networks as the knowledge discovery method is shown using a single data source residing in a flat (text) file, producing a results object containing a persistent representation of the data mining agent, and an output file containing the segmentation results. The "a" and "an" concatenated in front of the class names indicate that these clouds represent objects, that is, instances of that particular class.

The function to be provided in our sample application is that of classification. Classification involves the discovery of the underlying relationships between a set of independent input parameters, and a single dependent output or class variable. The sample data mining application is implemented using the preferred embodiment by subclassing the DataMiningAgent class, created a new ClassificationAgent class. The aDMAgent object in FIG. 19 is an instance of the ClassificationAgent class. The following methods are implemented to override the initialize( ) and mine( ) methods in the DataMiningAgent parent class. In addition, a customized control script is written to manage the training and testing of the neural network classifier.

In step 1, the mine( ) method calls the initialize( ) method in the ClassificationAgent class. The initialize( ) method in aDMAgent class instantiates the set of mining objects required to perform the classification data mining function. These include, a DataImport object (anImport), two DataFilter objects (anInFilter and anOutFilter), one BackPropNetwork object (aBackPropNetwork), a DataExport object (anExport), and a ControlScript object (aScript). DataConnection objects are then defined, connecting the OutputBuffer of anImport to the InputBuffer of anInFilter, the OutputBuffer of anInFilter to the InputBuffer of aBackPropNetwork, the OutputBuffer of BackPropNetwork to the InputBuffer of anOutFilter, and the OutputBuffer of anOutFilter to the InputBuffer of anExport. The ControlScript is opened using open( ) on a script text file, which defines the control strategy to be used for training and testing the neural network classifier.

At step 2, aDMAgent calls the aScript process( ) method. This causes the aScript object to begin processing the script. An example script file is shown below.

At step 3, the aScript process calls the aDMagent process( ) method and instructs it to control the data mining function according to statements in the script file. In response to the statements in the script file, the aDMAgent objects executes the steps that follow.

At step 4, aDMAgent calls the anImport process( ) method and instructs it to read the data from the data source and put the data in the anImport OutputBuffer.

At step 5, aDMAgent calls the anInfilter process( ) method and instructs anInFilter to filter the data.

At step 6, anInFilter uses the DataConnection to get the data by calling the AConnect1 process( ) method. AConnect1 moves the data from the anImport output buffer to the anInFilter input buffer. The anInFilter process( ) method now filters the data as previously described under FIG. 14 and puts the filtered data in its output buffer.

At step 7, aDMAgent calls the aBackPropNetwork process( ) method and instructs it to discover underlying relationships in the data, as previously described under FIG. 15.

At step 8, aBackPropNetwork calls the process( ) method for aConnect2 to move the filtered data from the output buffer of anInFilter to the input buffer of aBackPropNetwork. The aBackPropNetwork object now analyzes the data looking for underlying relationships as previously described under FIG. 15. This step may involve many passes through the data in both a training and a running mode. When the neural network is trained, the DataExport object is turned on via the setState( ) method. Although the aRuleBase object is not shown as interacting with the other objects in the example of FIG. 19, it could be optionally used to pick the proper discovery mechanism or to judge the accuracy of the results, as previously described under FIG. 17.

Referring again to FIG. 19, at step 9, aDMAgent calls the process( ) method for anOutFilter and instructs it to filter the results.

At step 10, anOutFilter calls the process( ) for aConnect3 and instructs it to move the results from the output buffer of aBackPropNetwork to the inputbuffer of anOutFilter. Then, the anOutFilter process( ) method filters the results, as previously described under FIG. 14, and puts the filtered results in its output buffer.

At step 11, aDMAgent calls the anExport process( ) method and instructs it to move the results to the target.

At step 12, anExport calls the process( ) method of aConnect4 to move the filtered results from the output buffer of anOutFilter to the target.

The entire DataMiningAgent is now made persistent by streaming the constituent MiningObjects out to a file using the DataMiningObject save( ) method.

Figure 20A:
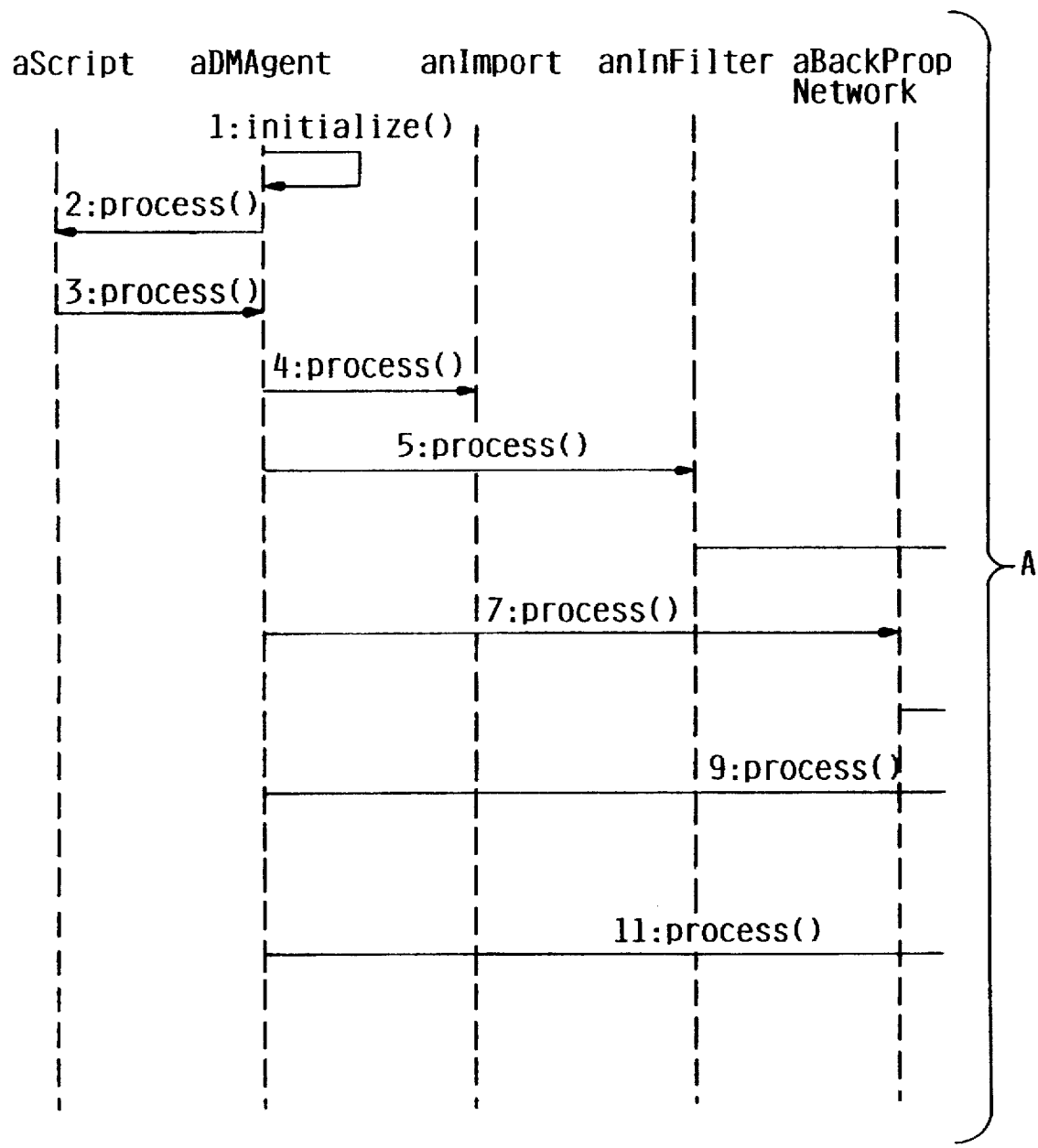
Figure 20B:
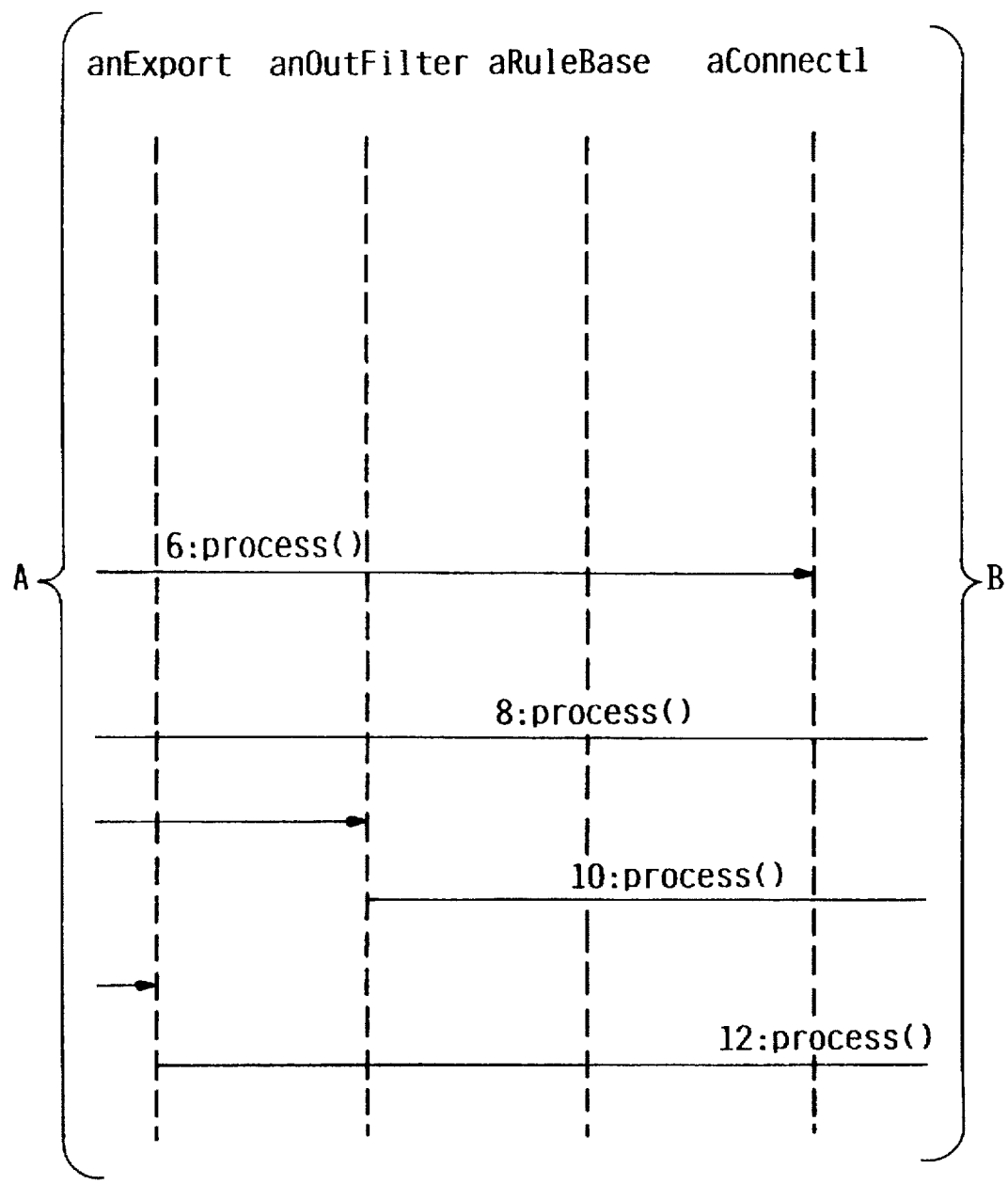
Figure 20C:
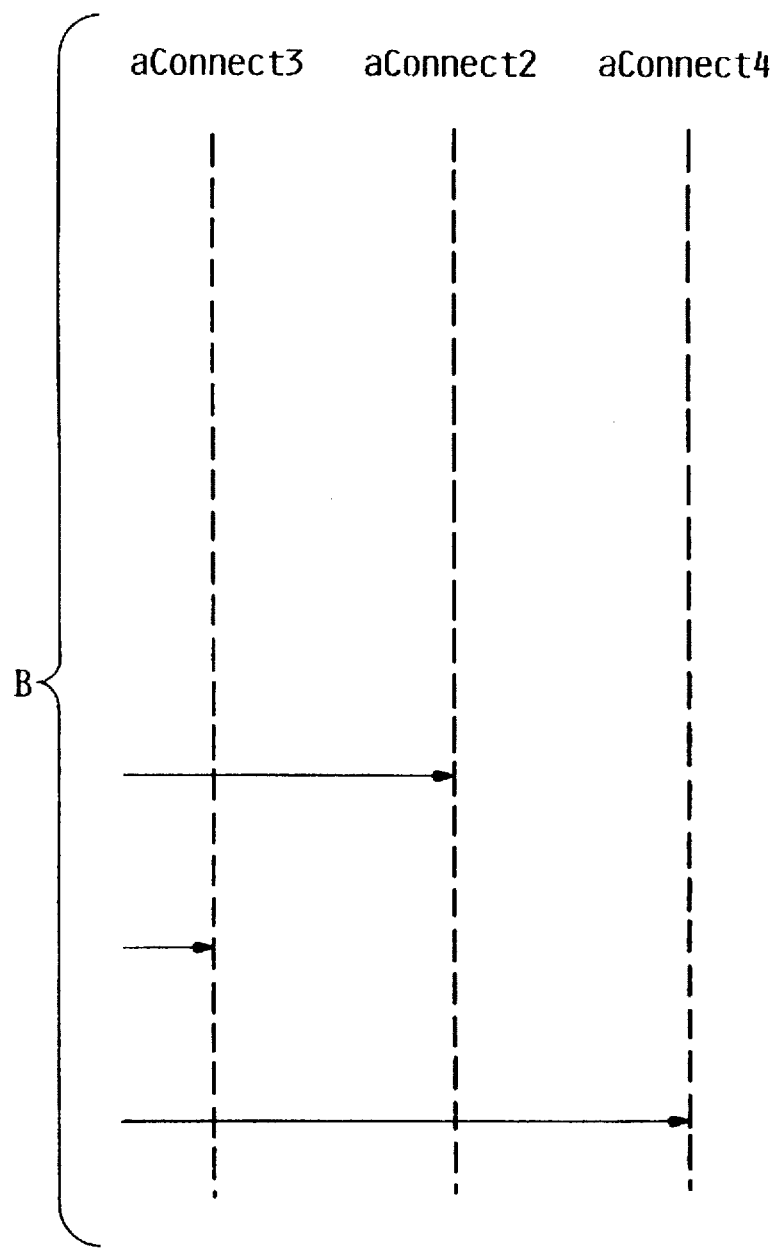

FIG. 20 is an interaction diagram that conveys the same information as FIG. 19.

The embodiments and examples set forth herein were presented in order to best explain the present invention and its practical application and to thereby enable those skilled in the art to make and use the invention. However, the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the forthcoming claims.

The following is an example of a FuzzyRuleBase that would be loaded by a FuzzyRuleBase open( ) method and used by a FuzzyRuleBase process( ) method.

```
;==================================================== ;
; RuleBase for evaluating a partially trained neural network and returning a
; score based on the complexity of the network and the overall accuracy of
; the network.
;
;
;----------------------------------------------------------
;==================================

RuleBase Idmr_Eval_Net_Performance (

;======================================================
; RuleBase Options:
;======================================================
        InferenceMethod   (MinMax  )      ; MinMax   or FuzzyAdd
        CorrelationMethod (Product)       ; Product  or Minimum
        DefuzzifyMethod   (Centroid)      ; Centroid or MaxHeight
        LowTruthValue     ( .009  )       ; 0.0 < n < 1.0

;==================================================== ;
Variables:
;======================================================
Variables ( NumberOfInputs    Numeric( 0 )
```

```
NumberOfOutputs   Numeric( 0 )

PercentAccurate   Continuous( 0 to 100      ) SetDef(
     Low            Shoulder  ( 10, 30, Left )
     MediumLow      Triangle  ( 10, 30, 50 )
     Medium  Triangle  ( 30, 50, 70 )
     MediumHigh     Triangle  ( 50, 70, 90 )
     High           Shoulder  ( 70, 90, Right)
     )
PercentIncorrect  Continuous( 0 to 100      ) SetDef(
     Low            Shoulder  ( 10, 30, Left )
     MediumLow      Triangle  ( 10, 30, 50 )
     Medium         Triangle  ( 30, 50, 70 )
     MediumHigh     Triangle  ( 50, 70, 90 )
     High           Shoulder  ( 70, 90, Right)
     )

NodesHiddenLayer1 Continuous( 0 to 250      ) SetDef(
     Low            Linear    ( 0, 50, Down )
     Medium         Triangle  ( 0, 50, 100 )
     High           Shoulder  ( 50, 150, Right)
     )

NodesHiddenLayer2 Continuous( 0 to 250      ) SetDef(
     Low            Linear    ( 0, 50, Down )
     Medium         Triangle  ( 0, 50, 100 )
     High           Shoulder  ( 50, 150, Right)
     )
```

```
NodesHiddenLayer3  Continuous( 0 to 250     ) SetDef(
    Low         Linear    ( 0, 50, Down )
    Medium      Triangle  ( 0, 50, 100 )
    High        Shoulder  ( 50, 150, Right)
    )

NetAccuracy     Continuous( 0 to 100    ) SetDef(
    Low         Shoulder  ( 10, 30, Left )
    MediumLow   Triangle  ( 10, 30, 50 )
    Medium      Triangle  ( 30, 50, 70 )
    MediumHigh  Triangle  ( 50, 70, 90 )
    High        Shoulder  ( 70, 90, Right)
    )

NetComplexity   Continuous( 0 to 100    ) SetDef(
    Low         Shoulder  ( 10, 30, Left )
    MediumLow   Triangle  ( 10, 30, 50 )
    Medium      Triangle  ( 30, 50, 70 )
    MediumHigh  Triangle  ( 50, 70, 90 )
    High        Shoulder  ( 70, 90, Right)
    )

Score           Continuous( 0 to 100    ) SetDef(
    Poor        Shoulder  ( 7.14, 21.43, Left )
    Low         Triangle  ( 7.14, 21.43, 35.71 )
    MediumLow   Triangle  ( 21.43, 35.71, 50.00 )
    Medium      Triangle  ( 35.71, 50.00, 64.29 )
    MediumHigh  Triangle  ( 50.00, 64.29, 78.57 )
    High        Triangle  ( 64.29, 78.57, 92.86 )
    Excellent   Shoulder  ( 78.57, 92.86, Right )
```

```
                    )

;NA Symbolic (NetAccuracy... )
                   ;NC Symbolic (NetComplexity...)
                   ;SC Symbolic (Score...        )
5                    )

;===================================================== ;
                   I/O Specifications:
                   ;=====================================================
                   ;InputVariables  ()
10                 ;OutputVariables ( NA NetAccuracy NC NetComplexity SC Score )
                    InputVariables  ( NumberOfInputs,
                                   NodesHiddenLayer1, NodesHiddenLayer2, NodesHiddenLayer3,
                                   NumberOfOutputs,
                                   PercentAccurate, PercentIncorrect )
15                  OutputVariables ( Score )

;===================================================== ;
                   Rules:
                   ;=====================================================
                   Rules ( 20                 ;: NA = NetAccuracy...
                   ;: NC = NetComplexity...
                   ;: SC = Score...
                   ;: NodesHiddenLayer1 = 35
                   ;: NodesHiddenLayer2 = 10
```

```
;; NodesHiddenLayer3 =  7
;; PercentAccurate   =  100
;; PercentIncorrect  =  0

;===========================================================
; Rules to determine this net's accuracy:
;===========================================================
A011 : If
        PercentAccurate  is High and
        PercentIncorrect is Low
    then
        NetAccuracy is positively very High A012 : If
        PercentAccurate  is High and
        PercentIncorrect is MediumLow
    then
        NetAccuracy is positively High A013 : If
        PercentAccurate  is High and
        PercentIncorrect is Medium
    then
        NetAccuracy is High A014 : If
        PercentAccurate  is High and
        PercentIncorrect is MediumHigh
    then
        NetAccuracy is somewhat High
```

```
A015 : If
    PercentAccurate is High and
    PercentIncorrect is High
   then
5       NetAccuracy is slightly High A021 : If
    PercentAccurate is MediumHigh and
    PercentIncorrect is Low
   then
10      NetAccuracy is positively very MediumHigh A022 : If
    PercentAccurate is MediumHigh and
    PercentIncorrect is MediumLow
   then
15      NetAccuracy is positively MediumHigh A023 : If
    PercentAccurate is MediumHigh and
    PercentIncorrect is Medium
   then
20      NetAccuracy is MediumHigh A024 : If
    PercentAccurate is MediumHigh and
    PercentIncorrect is MediumHigh
   then
25      NetAccuracy is somewhat MediumHigh
```

A025 : If
    PercentAccurate is MediumHigh and
    PercentIncorrect is High
then
    NetAccuracy is slightly MediumHigh A031 : If
    PercentAccurate is Medium and
    PercentIncorrect is Low
then
    NetAccuracy is positively very Medium A032 : If
    PercentAccurate is Medium and
    PercentIncorrect is MediumLow
then
    NetAccuracy is positively Medium A033 : If
    PercentAccurate is Medium and
    PercentIncorrect is Medium
then
    NetAccuracy is Medium A034 : If
    PercentAccurate is Medium and
    PercentIncorrect is MediumHigh
then
    NetAccuracy is somewhat Medium A035 : If
    PercentAccurate is Medium and
    PercentIncorrect is High
   then
    NetAccuracy is slightly Medium A041 : If
    PercentAccurate is MediumLow and
    PercentIncorrect is Low
   then
    NetAccuracy is positively very MediumLow A042 : If
    PercentAccurate is MediumLow and
    PercentIncorrect is MediumLow
   then
    NetAccuracy is positively MediumLow A043 : If
    PercentAccurate is MediumLow and
    PercentIncorrect is Medium
   then
    NetAccuracy is MediumLow A044 : If
    PercentAccurate is MediumLow and
    PercentIncorrect is MediumHigh
   then
    NetAccuracy is somewhat MediumLow A045 : If
    PercentAccurate is MediumLow and
    PercentIncorrect is High
  then
    NetAccuracy is slightly MediumLow A051 : If
    PercentAccurate is Low and
    PercentIncorrect is Low
  then
    NetAccuracy is slightly Low A052 : If
    PercentAccurate is Low and
    PercentIncorrect is MediumLow
  then
    NetAccuracy is somewhat Low A053 : If
    PercentAccurate is Low and
    PercentIncorrect is Medium
  then
    NetAccuracy is Low A054 : If
    PercentAccurate is Low and
    PercentIncorrect is MediumHigh
  then
    NetAccuracy is positively Low A055 : If PercentAccurate is Low and PercentIncorrect is High then NetAccuracy is positively very Low ;================================================
; Rules to determine this net's complexity:
;================================================

C011 : If

NodesHiddenLayer2 = 0 and

NodesHiddenLayer1 is Low then

NetComplexity is positively very Low

C012 : If

NodesHiddenLayer2 = 0 and

NodesHiddenLayer1 is Medium then

NetComplexity is Low

C013 : If

NodesHiddenLayer2 = 0 and

NodesHiddenLayer1 is High then

NetComplexity is slightly Low

C021 : If

NodesHiddenLayer2 <> 0 and

NodesHiddenLayer3 = 0 and

NodesHiddenLayer2 is Low
then
NetComplexity is MediumLow

C022 : If
NodesHiddenLayer2 <> 0 and
NodesHiddenLayer3 = 0 and
NodesHiddenLayer2 is Medium
then
NetComplexity is Medium C023 : If
NodesHiddenLayer2 <> 0 and
NodesHiddenLayer3 = 0 and
NodesHiddenLayer2 is High
then
NetComplexity is MediumHigh C031 : If
NodesHiddenLayer3 <> 0 and
NodesHiddenLayer3 is Low
then
NetComplexity is slightly High C032 : If
NodesHiddenLayer3 <> 0 and
NodesHiddenLayer3 is Medium
then
NetComplexity is High

```
C033 : If
        NodesHiddenLayer3 <> 0 and
        NodesHiddenLayer3 is High
    then
        NetComplexity is positively very High ;===================================================
; Rules to determine this net's overall score.
;===================================================
S011 : If
        NetAccuracy   is High and
        NetComplexity is Low
    then
        Score is positively very Excellent S012 : If
        NetAccuracy   is High and
        NetComplexity is MediumLow
    then
        Score is positively Excellent S013 : If
        NetAccuracy   is High and
        NetComplexity is Medium
    then
        Score is Excellent S014 : If
        NetAccuracy   is High and
        NetComplexity is MediumHigh
``` then

Score is slightly Excellent

S015 : If

NetAccuracy is High and

NetComplexity is High then

Score is positively very High

S021 : If

NetAccuracy is MediumHigh and

NetComplexity is Low then

Score is High

S022 : If

NetAccuracy is MediumHigh and

NetComplexity is MediumLow then

Score is somewhat High

S023 : If

NetAccuracy is MediumHigh and

NetComplexity is Medium then

Score is slightly High

S024 : If

NetAccuracy is MediumHigh and

NetComplexity is MediumHigh then

Score is positively very MediumHigh

S025 : If

NetAccuracy is MediumHigh and

NetComplexity is High then

Score is MediumHigh

S031 : If

NetAccuracy is Medium and

NetComplexity is Low then

Score is somewhat MediumHigh

S032 : If

NetAccuracy is Medium and

NetComplexity is MediumLow then

Score is slightly MediumHigh

S033 : If

NetAccuracy is Medium and

NetComplexity is Medium then

Score is positively very Medium

S034 : If

NetAccuracy is Medium and

NetComplexity is MediumHigh then
Score is Medium

S035 : If
    NetAccuracy   is Medium and
    NetComplexity is High
then
    Score is somewhat Medium S041 : If
    NetAccuracy   is MediumLow and
    NetComplexity is Low
then
    Score is slightly Medium S042 : If
    NetAccuracy   is MediumLow and
    NetComplexity is MediumLow
then
    Score is positively very MediumLow S043 : If
    NetAccuracy   is MediumLow and
    NetComplexity is Medium
then
    Score is MediumLow S044 : If
    NetAccuracy   is MediumLow and
    NetComplexity is MediumHigh then
Score is somewhat MediumLow S045 : If
NetAccuracy is MediumLow and
NetComplexity is High
then
Score is slightly MediumLow S051 : If
NetAccuracy is Low and
NetComplexity is Low
then
Score is slightly Poor S052 : If
NetAccuracy is Low and
NetComplexity is MediumLow
then
Score is somewhat Poor S053 : If
NetAccuracy is Low and
NetComplexity is Medium
then
Score is Poor S054 : If
NetAccuracy is Low and
NetComplexity is MediumHigh then Score is positively Poor S055 : If NetAccuracy　is Low and NetComplexity is High then Score is positively very Poor

)

The following sample code is an example of the contents of a script file interpreted by the process( ) method of the ControlScript class. The script loops, calling the ClassificationAgent's process( ) method repeatedly until the BackPropNetwork error rate falls below the specified target. At this point, the neural network is locked, and the DataImport is switched to use the test or out-sample data. In the preferred embodiment, the control strategy implemented in the ControlScript alternates between training and test data sets until the classification accuracy of the neural network classifier meets the desired level.

```
// Backpropagation classification control script
// Variables which are assumed set externally in caps
// Uses this configuration:
//
// IMPORT ---> FILTER ---> NETWORK
//------------------------------------------------
// set these variables externally after statements
// are parsed and before the script is processed
Variable PHASE           // either 0=search or 1=train
Variable AGENT           // name of the agent object
Variable IMPORT          // name of train/test import object
Variable NETWORK         // name of the network object
Variable NETWORKNAME     // name of network file to save
Variable ACCURACY        // minimum accuracy allowed
Variable ERRORLIMIT      // maximum error percent allowed
Variable TRAINRECORDS    // records in training data
Variable TESTRECORDS     // records in testing data
Variable MAXEPOCHS       // max number of times to train and test
Set MAXEPOCHS = 500      // set default here, so it can be changed
// internal variables
Variable i
Set i = 0
Set NETWORK RecordsPerEpoch = TRAINRECORDS
// NOTE: This code is only executed when we are
//       searching for the best network architecture
If PHASE = 0
    Reset IMPORT
    Set IMPORT Mode = 1
    Set NETWORK Mode = TRAIN
    ClearAll NETWORK
    Set NETWORK RecordsPerEpoch = TRAINRECORDS
    SetBreakPoint NETWORK EpochCount >= 30
    SetBreakPoint NETWORK Mode > TRAIN    // in case it trains
    Run        // train for specified number of epochs
    RunMacro TestNet     // do single pass on test data
    Halt True            // stop here so net can be evaluated
EndIf
RunMacro CoarseTrain     // first get close
GetValue NETWORK EpochCount = i
While i < MAXEPOCHS
    If NETWORK Mode <> RUN
        RunMacro TrainNet
        RunMacro TestNet
    Else
        Set i = MAXEPOCHS   // force end of loop
    EndIf
    Set i += 1
EndWhile
If NETWORK Mode = RUN
    Halt True     // network has passed tests
Else
    Halt False    // network failed
EndIf
// end of main
//------------------------------------------------
// Train the network until MaxEpochs or percentCorrect is good
// Note: This will stay in train mode for a long time
Macro CoarseTrain
    Reset IMPORT
    Set IMPORT Mode = 1
    Set NETWORK Mode = TRAIN
    ClearAll NETWORK
    Set NETWORK RecordsPerEpoch = TRAINRECORDS
    SetBreakPoint NETWORK EpochCount >= MAXEPOCHS    // how long to train????
    SetBreakPoint NETWORK PercentCorrect >= ACCURACY
    Run
    Reset IMPORT    // must reset because we could be anywhere in file
EndMacro
//------------------------------------------------
// turn training on and set breakpoint when ready to test
Macro TrainNet
    Reset IMPORT
```

```
            Set IMPORT Mode = 1
            Set NETWORK Mode = TRAIN
            ClearAll NETWORK
            Set NETWORK RecordsPerEpoch = TRAINRECORDS
            Cycle TRAINRECORDS
    EndMacro
    //--------------------------------------------------------------
    // lock network weights and see if accuracy and error objectives met
    Macro TestNet
            Reset IMPORT
            Set IMPORT Mode = 2
            Set NETWORK Mode = TEST
            ClearAll NETWORK
            Set NETWORK RecordsPerEpoch = TESTRECORDS
            Cycle TESTRECORDS
            Set NETWORK Mode = RUN    // assume its done
            If NETWORK PercentCorrect < ACCURACY   // PercentCorrect too low
                Set NETWORK Mode = TRAIN // need more training
            EndIf
            If NETWORK PercentIncorrect > ERRORLIMIT   // PercentIncorrect too high
                Set NETWORK Mode = TRAIN // need more training
            Endif
    EndMacro
```

Notation

There is, as yet, no uniformly accepted notation for communicating object-oriented programming ideas. The notation used in this specification is very similar to that known in the programming industry as Booch notation, after Grady Booch. Mr. Booch is the author of *Object-Oriented Analysis and Design With Applications*, 2nd ed. (1994), available from The Benjamin/Cummings Publishing Company, Inc. Use of Booch notation concepts within this specification should not be taken to imply any connection between the inventors and/or the assignee of this patent application and Mr. Booch or Mr. Booch's employer. The notational system used by Mr. Booch is more fully explained at Chapter 5, pp. 171-228 of the aforementioned book. The notational system used herein will be explained generally below. Other notational conventions used herein will be explained as needed.

A system that is modeled by an object-oriented framework can be represented at a high level of abstraction by a diagram called a top-level class diagram. FIG. 1 of the drawings is an example of a top-level class/category diagram containing boxes that represent abstractions of the modeled system. The boxes are arranged in a hierarchy such that boxes representing abstractions close to the physical components of the system are at the lower levels of the diagram, and boxes representing more abstract, functional components are closer to the top of the diagram. In FIG. 1, the boxes are labelled as "mechanisms" to denote that the abstractions comprise means for implementing modeled system components. The boxes (mechanisms) can be thought of as categories comprising groups of similar classes defined according to object-oriented programming concepts. FIG. 1 represents a zoo administration model and therefore the lower hierarchy boxes include a box called Animal Mechanism, which represents animals within the zoo model, and a box called Containment Unit Mechanism, which represents animal pens and cages. At the highest level of FIG. 1, the box called Zoo Administration represents a functional abstraction that encompasses a variety of administrative tasks that are performed by personnel.

The boxes in a top-level class diagram represent the system abstractions that provide the system behavior. The system abstractions include classes and objects. Details of the system classes are provided in a class diagram that is used to show the class categories and to indicate the relationships and responsibilities of the classes. A class is represented by an irregularly shaped, dashed-line icon commonly referred to a cloud. FIG. 2, for example, shows several classes represented as clouds. Each class is identified by a name that is unique to the associated class category and also indicates the relationship of each class to one of the mechanisms illustrated in FIG. 1. Within a class icon, the class name is listed above attribute names, operation names followed by parentheses, and constraints that are enclosed within brackets. FIG. 3 illustrates the class Zoo Administrator in greater detail. FIG. 3 indicates that the Zoo Administrator class includes multiple operations, including ones called "5_minute_timer( )", "add_animal( )", and "add_containment_unit( )". Words in the operation names (and class attribute names) are separated by an underscore for easier reading. An example of a class attribute listing is shown by the attributes called "feed_freq" and "temp_range" in the class Animals illustrated in FIG. 5.

Connecting lines between mechanisms (FIG. 1) and classes (FIG. 2) indicate the nature of the relationships between such respective abstractions. Thus, connections between the boxes in FIG. 1 represent relationships between the various mechanisms. A straight connecting line, for example, represents a simple association relationship indicating shared information. A "using" relationship is a refinement of a simple association whereby one abstraction that is referred to as a server or supplier provides services to another abstraction that is referred to as a client. Such a relationship is indicated by an open circle at one end of a simple association line, the open circle end designating the client that "uses" the associated server.

Another refinement of a simple association between two classes is a type referred to as an inheritance relationship. Inheritance is a relationship among classes in which one class shares the structure and/or behavior associated with one or more other classes. An inheritance association is also referred to as a "is a" relationship. Thus, given two classes A and B, the class A has an inheritance relationship with the class B if A is an example of a B; A is said to be a subclass of B and B is said to be a superclass or parent of A. That is, A "is a" B. An inheritance relationship is denoted with a connecting line that includes an arrowhead at one end to indicate a subclass that derives its characteristics from a parent class at the other end of the line.

Another refinement of class relationships is called an aggregation relationship, which denotes an association between a whole and its parts or attribute classes. In notation, an aggregation relationship is indicated between a whole class and an attribute class connected with an association line by a solid circle at the whole class end, with an attribute class at the other end.

Another relationship specified by a class diagram is an instantiation relationship. An instantiation relationship represents an instance of a class such as a particular implementation of a class as supported by a programming language. For example, a class called "animal" can have multiple instantiations comprising lions, tigers, and bears. An instantiation of a class is represented by a dashed association line with an arrowhead pointing from an instance of a class to the general class.

Finally, a class relationship referred to as a metaclass denotes a relationship in which a class itself is treated as an object that can be manipulated. That is, a metaclass is a class whose instances are themselves classes. Some computer languages, such as Small Talk, support the concept of a metaclass. Such relationships are denoted by a shaded line with an arrowhead pointing from an instance of a metaclass to the general metaclass.

Classes can be parameterized, which denotes a family of classes whose structure and behavior are defined independently of its formal class parameters. A parameterized class is represented by a cloud-shaped class icon with a rectangular box placed over a portion of the cloud. The parameter list is named within the rectangular box. An instantiated class includes a parameter box, called an adornment, in contrast to a dashed line box for a general class. The instantiation relationship between a parameterized class and its instantiated class is represented as a dashed line pointing to the parameterized class. Typically, an instantiated class requires a "using" relationship to another concrete class for use as an actual parameter.

Properties of classes can be represented by class adornments that are enclosed within the class cloud icon. In particular, an abstract class is denoted by an upper case block "A" within a triangle that is placed within a cloud. An abstract class is a class for which no instances may be created. That is, it is a class of classes. Other class adornments are functions of the OO implementation language. For example, the C++ language permits special class qualifications that will be given special adornments. A static class is represented by an upper case block "S" within an adornment triangle, a friend class is denoted by an upper case block "F" within an adornment triangle, and a virtual class is represented by an upper case block "V" within an adornment triangle.

In addition to defining classes, a designer of an object oriented programming system must define objects (see page 136 of Booch). Objects are represented as solid line clouds within which is placed the object name located above a list of object attributes. An object is a tangible entity that exhibits a well defined behavior. An object is intended to represent some part of a real system that is being represented by the object oriented program. An object is characterized by a state, a behavior, and an identity. An object can be thought of as an instance of a class. The behavior of an object is an indication of how the object acts and reacts in terms of its state changes and its message-passing actions.

Objects and their interrelationships are represented in object diagrams that comprise object icons having links that indicate synchronization between objects. Links are sequentially numbered to indicate the flow of operations. The existence of a link between two objects indicates an association between their corresponding classes and denotes a path of communication between them. Thus, a link between two objects indicates that one object may send messages to another. The direction of message transfer is indicated by adorning a simple connecting line with an arrowhead that points from an object that invokes an operation, referred to as the client, to the object that provides the operation, referred to as the supplier. Such a representation of a simple synchronization relationship denotes the simplest form of message-passing. Such an association can indicate, for example, the invocation of an operation. Operation parameters can be indicated adjacent the linking line.

Some objects may be active, meaning that they embody their own thread of control. That is, such objects are not simply sequential. Active objects may have a variety of concurrency characteristics. If an object has multiple threads of control, then synchronization must be specified. Message synchronization can be synchronous, meaning that the client will wait until the supplier accepts the message. Synchronous synchronization is indicated with an "X" with an arrowhead. Synchronization can encompass balking message-passing, meaning that the client will abandon the message if the supplier cannot immediately service the message. Balking is indicated with an arrowhead turned back on itself. Synchronization can encompass a time-out synchronization, meaning that the client will abandon the message if the supplier cannot service the message within a specified amount of time. Time-out synchronization is indicated with a clock face representation adjacent a linking arrowhead. Finally, synchronization can encompass an asynchronous message, meaning that the client sends an event to a supplier for processing, the supplier queues the message, and the client then proceeds without waiting for the supplier. Those skilled in the art will appreciate that asynchronous message synchronization is analogous to interrupt handling. Asynchronous message synchronization is indicated with a half arrowhead.

The Booch notation includes interaction diagrams that trace the execution of objects and classes. Interaction diagrams are essentially restructured object diagrams. That is, interaction diagrams do not convey any additional information from that conveyed by object diagrams, but simply present the same information in a different format. The present specification makes use of object diagrams rather than interaction diagrams, but those skilled in the art will recognize that they are equivalent and also will understand how to convert from one to the other without further explanation.

In FIG. 7, for example, the object called Zelda 706 obtains a list of current zoo keepers by calling an operation called List Zoo Keepers from the object called Zoo Keeper Register. The second processing step is represented in FIG. 7 by the Zoo Keeper Register object responding to the operation call by passing a message to the Zelda object that comprises the zoo keeper list. The zoo keeper objects include members of the Zoo Keepers class called Tina, Vince, and Fred. The third step indicated in the object diagram is for the object Zelda to pass a message to each of the zoo keepers instructing them to check the animals by calling the respective Check Animals operation of each zoo keeper object.

I claim:

1. A program product, comprising:
    an object-oriented framework mechanism that reads data from a data import object in a data import class, discovers underlying relationships in the data via a knowledge discovery mechanism, and writes the underlying relationships to a data export object in a data export class, the framework mechanism executing on the central processing unit; and signal bearing media bearing the framework mechanism.

2. The program product of claim 1, wherein the knowledge discovery mechanism further comprises a neural network class, comprising:

an object having a neural network type; and a set of object methods to effect the discovery of underlying relationships in the data.

3. The program product of claim 2, wherein the object is a back propagation neural network.

4. The program product of claim 2, wherein the object is a Kohonen map neural network.

5. The program product of claim 1 wherein the framework further defines a data filter class, comprising:

a data filter object: and a set of data filter object methods to filter the data from the data import object before presentation to the knowledge discovery mechanism.

6. The program product of claim 1 wherein the framework further defines a data filter class, comprising:

a data filter object; and a set of data filter object methods to filter the results from the knowlege discovery mechanism before presentation to the data export object.

7. The program product of claim 6, wherein the data filter class is an extensible class of the framework, the implementation of which by a user defines additional operators by creating subclasses of the data filter class.

8. The program product of claim 6, wherein the data filter class is an extensible class of the framework, the implementation of which by a user defines additional data types by creating subclasses of the data filter class.

9. The program product of claim 1, wherein the framework mechanism further defines a control script class, comprising:

a control script object: and a set of control script object methods to control the data mining function.

10. The program product system of claim 9, wherein the control script object methods produce a set of control script records and control script variables.

11. The program product of claim 1, wherein the framework mechanism further defines a fuzzy rule base class, comprising:

a fuzzy rule base object;

an open method that reads a rule base file and instantiates a set of fuzzy rule, fuzzy set, and fuzzy variable objects; and a set of fuzzy rule base object methods that chooses the most appropriate neural network architecture based on the data from the data import object and based on the set of fuzzy rule, fuzzy set, and fuzzy variable objects.

12. The program product of claim 1, wherein the framework mechanism further defines a data connection class, comprisng:

a data connection object; and a set of data connection object methods that move data between mining objects.

13. The program product of claim 1, wherein the data import class is an extensible class of the framework, the implementation of which by a user defines additional data types by creating subclasses of the data import class.

14. The program product of claim 1, wherein the data export class is an extensible class of the framework, the implementation of which by a user defines additional data types by creating subclasses of the data export class.

15. The program product of claim 1 wherein the framework further comprises:

core functions defined by at least one core class, wherein the implementation of the core functions is defined by the framework and cannot be modified by a user of the framework; and extensible functions defined by at least one extensible class, wherein the implementation of the extensible functions is defined by the user of the framework by extending the at least one extensible class.

16. A computer system, the computer system comprising:

a central processing unit; and main memory connected to the central processing unit, the main memory containing an object-oriented framework mechanism that provides an extensible data mining mechanism that reads data from a data import object in a data import class, discovers underlying relationships in the data via a knowledge discovery mechanism, and writes the underlying relationships to a data export object in a data export class, the framework mechanism executing on the central processing unit.

17. The computer system of claim 16, wherein the knowledge discovery mechanism further comprises a neural network class, comprising:

an object having a neural network type; and a set of object methods to effect the discovery of underlying relationships in the data.

18. The computer system of claim 17, wherein the object is a back propagation neural network.

19. The computer system of claim 17, wherein the object is a Kohonen map neural network.

20. The computer system of claim 16 wherein the framework further defines a data filter class, comprising:

a data filter object: and a set of data filter object methods to filter the data from the data import object before presentation to the knowledge discovery mechanism.

21. The computer system of claim 16 wherein the framework further defines a data filter class, comprising:

a data filter object; and a set of data filter object methods to filter the results from the knowlege discovery mechanism before presentation to the data export object.

22. The computer system of claim 21, wherein the data filter class is an extensible class of the framework, the implementation of which by a user defines additional operators by creating subclasses of the data filter class.

23. The computer system of claim 21, wherein the data filter class is an extensible class of the framework, the implementation of which by a user defines additional data types by creating subclasses of the data filter class.

24. The computer system of claim 16, wherein the framework mechanism further defines a control script class, comprising:

a control script object: and a set of control script object methods to control the data mining function.

25. The computer system of claim 24, wherein the control script object methods produce a set of control script records and control script variables.

26. The computer system of claim 16, wherein the framework mechanism further defines a fuzzy rule base class, comprising:

a fuzzy rule base object;

an open method that reads a rule base file and instantiates a set of fuzzy rule, fuzzy set, and fuzzy variable objects; and a set of fuzzy rule base object methods that chooses the most appropriate neural network architecture based on the data from the data import object and based on the set of fuzzy rule, fuzzy set, and fuzzy variable objects.

27. The computer system of claim 16, wherein the framework mechanism further defines a data connection class, comprisng:

a data connection object; and a set of data connection object methods that move data between mining objects.

28. The computer system of claim 16, wherein the data import class is an extensible class of the framework, the implementation of which by a user defines additional data types by creating subclasses of the data import class.

29. The computer system of claim 16, wherein the data export class is an extensible class of the framework, the implementation of which by a user defines additional data types by creating subclasses of the data export class.

* * * * *